(12) United States Patent
Satou et al.

(10) Patent No.: US 7,537,713 B2
(45) Date of Patent: *May 26, 2009

(54) CONDUCTIVE PASTE FOR A MULTI-LAYERED CERAMIC ELECTRONIC COMPONENT AND A METHOD FOR MANUFACTURING A MULTI-LAYERED UNIT FOR A MULTI-LAYERED CERAMIC ELECTRONIC COMPONENT

(75) Inventors: Shigeki Satou, Tokyo (JP); Takeshi Nomura, Tokyo (JP)

(73) Assignee: TDK Corporation, Tokyo (JP)

( * ) Notice: Subject to any disclaimer, the term of this patent is extended or adjusted under 35 U.S.C. 154(b) by 421 days.

This patent is subject to a terminal disclaimer.

(21) Appl. No.: 10/590,683

(22) PCT Filed: Feb. 23, 2005

(86) PCT No.: PCT/JP2005/002882

§ 371 (c)(1),
(2), (4) Date: Aug. 25, 2006

(87) PCT Pub. No.: WO2005/083720

PCT Pub. Date: Sep. 9, 2005

(65) Prior Publication Data

US 2007/0194284 A1    Aug. 23, 2007

(30) Foreign Application Priority Data

Feb. 27, 2004    (JP)    ............... 2004-054723

(51) Int. Cl.
*H01B 1/22*    (2006.01)
*B05D 5/12*    (2006.01)
*H01G 4/12*    (2006.01)
*H01G 4/30*    (2006.01)

(52) U.S. Cl. ..................... 252/512; 427/96.1
(58) Field of Classification Search ......... 252/512–514; 427/58, 96.1
See application file for complete search history.

(56) References Cited

U.S. PATENT DOCUMENTS

| | | | | |
|---|---|---|---|---|
| 4,415,703 A * | 11/1983 | Toba et al. | ............... | 525/54.21 |
| 5,840,107 A * | 11/1998 | Salibay | .................... | 106/180.1 |
| 2003/0096056 A1* | 5/2003 | Kawamura et al. | ........... | 427/66 |

FOREIGN PATENT DOCUMENTS

| JP | 05-325633 | 12/1993 |
|---|---|---|
| JP | 06-053654 | 2/1994 |
| JP | 06-085466 | 3/1994 |
| JP | 06-224556 | 8/1994 |
| JP | 07-021832 | 1/1995 |
| JP | 07-021833 | 1/1995 |
| JP | 10-275734 | 10/1998 |
| JP | 11-053939 | 2/1999 |
| JP | 11-273987 | 10/1999 |
| JP | 2002-270456 | 9/2002 |
| JP | 2003-017356 | 1/2003 |
| JP | 2003-249121 | 9/2003 |

* cited by examiner

*Primary Examiner*—Mark Kopec
(74) *Attorney, Agent, or Firm*—Seep IP Law Group PLLC

(57) ABSTRACT

It is an object of the present invention to provide a method for manufacturing a multi-layered unit for a multi-layered ceramic electronic component which can reliably prevent short circuit failure from occurring in a multi-layered ceramic electronic component and form an electrode layer in a desired manner.

A method for manufacturing a multi-layered ceramic electronic component includes a step of printing a conductive paste containing a binder containing ethyl cellulose having a weight average molecular weight of $MW_L$ and ethyl cellulose having a weight average molecular weight of $MW_H$ at a weight ratio of $X:(1-X)$, where $MW_L$, $MW_H$ and $X$ are selected so that $X*MW_L+(1-X)*MW_H$ falls within a range of 145,000 to 215,000 and at least one solvent selected from the group consisting of isobornyl acetate, dihydroterpinyl methyl ether, terpinyl methyl ether, α-terpinyl acetate, I-dihydrocarvyl acetate, I-menthone, I-menthyl acetate, I-perillyl acetate and I-carvyl acetate on a ceramic green sheet containing a butyral system resin as a binder in a predetermined pattern, thereby forming an electrode layer.

8 Claims, No Drawings

CONDUCTIVE PASTE FOR A MULTI-LAYERED CERAMIC ELECTRONIC COMPONENT AND A METHOD FOR MANUFACTURING A MULTI-LAYERED UNIT FOR A MULTI-LAYERED CERAMIC ELECTRONIC COMPONENT

FIELD OF THE INVENTION

The present invention relates to a conductive paste for a multi-layered ceramic electronic component and a method for manufacturing a multi-layered unit for a multi-layered ceramic electronic component, and particularly to a conductive paste for a multi-layered ceramic electronic component which does not dissolve a binder contained in a layer adjacent to an electrode layer of the multi-layered ceramic electronic component and can reliably prevent short circuit failure from occurring in a multi-layered ceramic electronic component and a method for manufacturing a multi-layered unit for a multi-layered ceramic electronic component which can reliably prevent short circuit failure from occurring in a multi-layered ceramic electronic component.

BACKGROUND OF THE INVENTION

Recently, the need to downsize various electronic devices makes it necessary to downsize the electronic components incorporated in the devices and improve the performance thereof. Also in multi-layered ceramic electronic components, such as multi-layered ceramic capacitors, it is strongly required to increase the number of layers and make the laminated unit thinner.

When a multi-layered ceramic electronic component as typified by a multi-layered ceramic capacitor is to be manufactured, ceramic powders, a binder such as an acrylic system resin, a butyral resin or the like, a plasticizing agent such as a phthalate ester, glycol, adipate ester, phosphate ester or the like, and an organic solvent such as toluene, methyl ethyl ketone, acetone or the like are mixed and dispersed, thereby preparing a dielectric paste for a ceramic green sheet.

The dielectric paste is then applied onto a support sheet made of polyethylene terephthalate (PET), polypropylene (PP) or the like using an extrusion coater, a gravure coater or the like to form a coating layer and the coating layer is heated to dryness, thereby fabricating a ceramic green sheet.

Further, a conductive powder of nickel or the like and a binder are dissolved into a solvent such as terpineol, thereby preparing a conductive paste and the thus prepared conductive paste is printed on the ceramic green sheet in a predetermined pattern using a screen printing machine and dried, thereby forming an electrode layer.

When the electrode layer has been formed, the ceramic green sheet on which the electrode layer is formed is peeled off from the support sheet to form a multi-layered unit including the ceramic green sheet and the electrode layer. Then, a ceramic green chip is formed by laminating a desired number of the multi-layered units to form the laminated body, pressing the laminated body and dicing the laminated body.

Finally, the binder is removed from the green chip, the green chip is baked and an external electrode is formed, thereby completing a multi-layered ceramic electronic component such as a multi-layered ceramic capacitor.

At present, the need to downsize electronic components and improve the performance thereof makes it necessary to set the thickness of the ceramic green sheet determining the spacing between layers of a multi-layered ceramic capacitor to be equal to or smaller than 3 µm or 2 µm and to laminate three hundred or more multi-layered units each including a ceramic green sheet and an electrode layer.

DISCLOSURE OF THE INVENTION

Problems to be Solved by the Invention

However, in the case where an electrode layer is formed by printing a conductive paste prepared using terpineol, which is highly popular as a solvent for a conductive paste, on a ceramic green sheet formed using a butyral system resin, which is the most popular binder for a ceramic green sheet, the binder contained in the ceramic green sheet is dissolved by terpineol contained in the conductive paste and a ceramic green sheet is swollen or partially dissolved, whereby pinholes and cracks are generated in the ceramic green sheet to cause short circuit failure.

One proposed solution for these problems is to employ a hydrocarbon system solvent such as kerosene, decane or the like as the solvent for the conductive paste. However, since a hydrocarbon system solvent such as kerosene, decane or the like does not dissolve the binder component used for the conductive paste, it is impossible to completely replace the conventional solvent such as terpineol with a hydrocarbon system solvent such as kerosene, decane or the like. Therefore, since the acrylic system resin contained in the ceramic green sheet as a binder is still soluble in the solvent contained in the conductive paste to some extent, it is difficult to prevent generation of pinholes and cracks in the ceramic green sheet in the case where the ceramic green sheet is very thin, and since the viscosity of a hydrocarbon system solvent such as kerosene, decane or the like is lower than that of terpineol, it is difficult to control the viscosity of the conductive paste.

Furthermore, Japanese Patent Application Laid Open No. 5-325633, Japanese Patent Application Laid Open No. 7-21833 and Japanese Patent Application Laid Open No. 7-21832 propose a conductive paste prepared using a hydrogenated terpineol such as dihydroterpineol or a terpene system solvent such as dihydroterpineol acetate instead of terpineol as a solvent. However, since the acrylic system resin contained in the ceramic green sheet as a binder is also soluble in a hydrogenated terpineol such as dihydroterpineol or a terpene system solvent such as dihydroterpineol acetate to some extent, it is difficult to prevent generation of pinholes and cracks in a ceramic green sheet in the case where the ceramic green sheet is very thin.

Further, Japanese Patent Application Laid Open No. 2002-270456 discloses a multi-layered ceramic electronic component fabricated by printing a conductive paste containing isobornyl acetate as a solvent, which hardly dissolves a butyral system resin, on a ceramic green sheet containing a butyral system resin as a binder, thereby forming an electrode layer and discloses that it is preferable to employ ethyl cellulose as a binder of the conductive paste. However, since a conductive paste containing ethyl cellulose as a binder and isobornyl acetate as a solvent has low viscosity and high fluidity, when the conductive paste is printed on a ceramic green sheet using a screen printing machine, the conductive paste leaks from a screen printing plate and the electrode layer cannot be printed in a desired manner. Further, the thus printed electrode layer tends to blot.

It is therefore an object of the present invention to provide a conductive paste for a multi-layered ceramic electronic component which does not dissolve a binder contained in a layer adjacent to an electrode layer of the multi-layered ceramic electronic component, can reliably prevent short circuit failure from occurring in a multi-layered ceramic electronic component and has excellent printability.

It is another object of the present invention to provide a method for manufacturing a multi-layered unit for a multi-layered ceramic electronic component which can reliably prevent short circuit failure from occurring in a multi-layered ceramic electronic component and form an electrode layer in a desired manner.

Means for Solving the Problems

The inventors of the present invention vigorously pursued a study for accomplishing the above objects and, as a result, made the discovery that in the case where a conductive paste was prepared using a binder containing ethyl cellulose having a weight average molecular weight of $MW_L$ and ethyl cellulose having a weight average molecular weight of $MW_H$ at a weight ratio of $X:(1-X)$, where $MW_L$, $MW_H$ and X were selected so that $X*MW_L+(1-X)*MW_H$ fell within a range of 145,000 to 215,000, and at least one solvent selected from the group consisting of isobornyl acetate, dihydroterpinyl methyl ether, terpinyl methyl ether, α-terpinyl acetate, l-dihydrocarvyl acetate, l-menthone, l-menthyl acetate, l-menthyl acetate, l-perillyl acetate and l-carvyl acetate, it was possible to prepare a conductive paste having a viscosity suitable for printing and dissolve a binder of the conductive paste in a binder in a desired manner and even when the conductive paste was printed on a ceramic green sheet containing an acrylic system resin as a binder, the binder contained in the ceramic green sheet was not dissolved in the solvent contained in the dielectric paste and it was therefore possible to reliably prevent generation of pinholes and cracks in the ceramic green sheet even in the case where the ceramic green sheet was very thin.

The present invention is based on these findings and therefore, the objects of the present invention can be accomplished by a conductive paste containing a binder containing ethyl cellulose having a weight average molecular weight of $MW_L$ and ethyl cellulose having a weight average molecular weight of $MW_H$ at a weight ratio of $X:(1-X)$, where $MW_L$, $MW_H$ and X are selected so that $X*MW_L+(1-X)*MW_H$ falls within a range of 145,000 to 215,000 and at least one solvent selected from the group consisting of isobornyl acetate, dihydroterpinyl methyl ether, terpinyl methyl ether, α-terpinyl acetate, l-dihydrocarvyl acetate, l-menthone, l-menthyl acetate, l-perillyl acetate and l-carvyl acetate.

The objects of the present invention can be also accomplished by a method for manufacturing a multi-layered unit for a multi-layered ceramic electronic component comprising a step of printing a conductive paste containing a binder containing ethyl cellulose having a weight average molecular weight of $MW_L$ and ethyl cellulose having a weight average molecular weight of $MW_H$ at a weight ratio of $X:(1-X)$, where $MW_L$, $MW_H$ and X are selected so that $X*MW_L+(1-X)*MW_H$ falls within a range of 145,000 to 215,000 and at least one solvent selected from the group consisting of isobornyl acetate, dihydroterpinyl methyl ether, terpinyl methyl ether, α-terpinyl acetate, l-dihydrocarvyl acetate, l-menthone, l-menthyl acetate, l-perillyl acetate and l-carvyl acetate on a ceramic green sheet containing a butyral system resin as a binder in a predetermined pattern, thereby forming an electrode layer.

According to the present invention, it is possible to prepare a conductive paste having a viscosity suitable for printing and form an electrode layer in a desired manner. Further, according to the present invention, even when the conductive paste is printed on a very thin ceramic green sheet containing a butyral system resin as a binder, since the binder contained in the ceramic green sheet is not dissolved in the solvent contained in the dielectric paste, it is possible to reliably prevent the ceramic green sheet from being swollen or partially dissolved and it is therefore possible to reliably prevent generation of pinholes and cracks in the ceramic green sheet even in the case where the ceramic green sheet is very thin.

In the present invention, it is preferable for $MW_L$, $MW_H$ and X to be selected so that $X*MW_L+(1-X)*MW_H$ falls within a range of 155,000 to 205,000.

In the present invention, it is preferable for the degree of polymerization of a butyral system resin contained in a ceramic green sheet as a binder to be equal to or larger than 1000.

In the present invention, it is preferable for the degree of butyralization of butyral system resin contained in a ceramic green sheet as a binder to be equal to or larger than 64 mol % and equal to or smaller than 78 mol %.

In a preferred aspect of the present invention, prior to forming the electrode layer or after forming and drying the electrode layer, a dielectric paste containing a binder containing ethyl cellulose having a weight average molecular weight of $MW_L$ and ethyl cellulose having a weight average molecular weight of $MW_H$ at a weight ratio of $X:(1-X)$, where $MW_L$, $MW_H$ and X are selected so that $X*MW_L+(1-X)*MW_H$ falls within a range of 110,000 to 180,000 and at least one solvent selected from the group consisting of isobornyl acetate, dihydroterpinyl methyl ether, terpinyl methyl ether, α-terpinyl acetate, l-dihydrocarvyl acetate, l-menthone, l-menthyl acetate, l-perillyl acetate and l-carvyl acetate is printed on a ceramic green sheet in a complementary pattern to that of the electrode layer, thereby forming a spacer layer.

According to this preferred aspect of the present invention, since a spacer layer is formed on a ceramic green sheet in a complementary pattern to that of the electrode layer, it is possible to prevent a step from being formed between the surface of the electrode layer and the surface of the ceramic green sheet where no electrode layer is formed. Therefore, even in the case of laminating a number of multi-layered units each including a ceramic green sheet and an electrode layer and fabricating a multi-layered electronic component such as a multi-layered ceramic capacitor, it is possible to effectively prevent the thus fabricated multi-layered electronic component from being deformed and also effectively prevent delamination of layers from occurring.

Further, since a mixed solvent of terpineol and kerosene, dihydroterpineol, terpineol or like, which is popular as a solvent for a dielectric paste for forming a spacer layer, dissolves an acrylic system resin contained in a ceramic green sheet as a binder, when a spacer layer is formed on a ceramic green sheet, the ceramic green sheet is swollen or partially dissolved, whereby voids are generated at the interface between the ceramic green sheet and the spacer layer or fissures or wrinkles are generated on the surface of the spacer layer. As a result, in the case where a multi-layered ceramic capacitor is fabricated by laminating a number of multi-layered units to fabricate a laminated body and baking the laminated body, voids are generated in the multi-layered ceramic capacitor. Further, in the case where fissures or wrinkles are generated on the surface of the spacer layer, since the portions of the spacer layer where fissures or wrinkles are generated tend to drop off, when a number of multi-layered units are laminated to fabricate a laminated body, the portions of the spacer layer where fissures or wrinkles are generated mix into the laminated body as a foreign substance, thereby causing internal defects in the multi-layered ceramic capacitor and generating voids at portions where the spacer layer is missing. However, according to this preferred aspect of the present invention, since a dielectric paste for forming a spacer layer contains a binder containing ethyl cellulose having a weight average molecular weight of $MW_L$ and ethyl cellulose having a weight average molecular weight of $MW_H$ at a weight ratio of $X:(1-X)$, where $MW_L$, $MW_H$ and X are selected so that $X*MW_L+(1-X)*MW_H$ falls within a range of 110,000 to 180,000 and at least one solvent selected from the group consisting of isobornyl acetate, dihydroterpinyl methyl ether, terpinyl methyl ether, α-terpinyl acetate, l-dihydrocarvyl acetate, I-menthone, I-menthyl acetate, I-perillyl acetate and I-carvyl acetate and the solvent selected from the group consisting of isobornyl acetate, dihydroterpinyl methyl ether, terpinyl methyl ether, α-terpinyl acetate, I-dihydrocarvyl acetate, I-menthone, I-menthyl acetate, I-perillyl acetate and I-carvyl acetate hardly dissolves an acrylic system resin contained in a ceramic green sheet as a binder, it is possible to reliably prevent the ceramic green sheet from being swollen or partially dissolved so as to generate voids at the interface between the ceramic green sheet and the spacer layer or generate fissures or wrinkles on the surface of the spacer layer, and it is therefore possible to reliably prevent voids from being generated in a multi-layered ceramic electronic component such as a multi-layered ceramic capacitor.

Moreover, since a dielectric paste containing a binder containing ethyl cellulose having a weight average molecular weight of $MW_L$ and ethyl cellulose having a weight average molecular weight of $MW_H$ at a weight ratio of $X:(1-X)$, where $MW_L$, $MW_H$ and X are selected so that $X*MW_L+(1-X)*MW_H$ falls within a range of 110,000 to 180,000 and at least one solvent selected from the group consisting of isobornyl acetate, dihydroterpinyl methyl ether, terpinyl methyl ether, α-terpinyl acetate, I-dihydrocarvyl acetate, I-menthone, I-menthyl acetate, I-perillyl acetate and I-carvyl acetate has a viscosity suitable for printing, a spacer layer can be formed on a ceramic green sheet in a desired manner by printing a dielectric paste on the ceramic green sheet in a complimentary pattern to that of an electrode layer.

Further, in a study done by the inventors of the present invention, it was found that in the case of printing a conductive paste on a very thin ceramic green sheet to form an electrode layer, the solvent contained in the conductive paste for forming the electrode layer dissolved or swelled a binder component contained in the ceramic green sheet and, on the other hand, the conductive paste permeated into the ceramic green sheet, thereby causing short circuit failure and that, therefore, it was preferable to form the electrode layer on a support sheet separately from the ceramic green sheet and bond it onto the surface of the ceramic green sheet via an adhesive layer after drying it. However, in the case where the electrode layer is formed on the support sheet separately from the ceramic green sheet in this manner, in order to make the support sheet easy to peel off from the electrode layer, it is preferable to form a release layer containing the same binder as that contained in the ceramic green sheet on the support sheet and print a conductive paste on the release layer, thereby forming an electrode layer. Even in the case of printing a conductive paste on the release layer containing the same binder as that contained in the ceramic green sheet to form an electrode layer, when the release layer contains an acrylic system resin as a binder and the conductive paste contains terpineol as a solvent, the binder contained in the release layer is dissolved by the solvent contained in the conductive paste so that the release layer is swollen or partially dissolved, whereby voids are generated at the interface between the release layer and the electrode layer or fissures or wrinkles are generated on the surface of the electrode layer. As a result, in the case where a multi-layered ceramic capacitor is fabricated by laminating a number of multi-layered units to fabricate a laminated body and baking the laminated body, voids are generated in the multi-layered ceramic capacitor. Furthermore, in the case where fissures or wrinkles are generated on the surface of the electrode layer, since the portions of the electrode layer where fissures or wrinkles are generated tend drop off, when a number of multi-layered units are laminated to fabricate a laminated body, the portions of the electrode layer where fissures or wrinkles are generated mix into the laminated body as a foreign substance, thereby causing internal defects in the multi-layered ceramic capacitor and generating voids at portions where the electrode layer was missing.

However, according to the present invention, the electrode layer is formed using the conductive paste containing a binder containing ethyl cellulose having a weight average molecular weight of $MW_L$ and ethyl cellulose having a weight average molecular weight of $MW_H$ at a weight ratio of $X:(1-X)$, where $MW_L$, $MW_H$ and X are selected so that $X*MW_L+(1-X)*MW_H$ falls within a range of 145,000 to 215,000 and at least one solvent selected from the group consisting of isobornyl acetate, dihydroterpinyl methyl ether, terpinyl methyl ether, α-terpinyl acetate, I-dihydrocarvyl acetate, I-menthone, I-menthyl acetate, I-perillyl acetate and I-carvyl acetate and the solvent selected from the group consisting of isobornyl acetate, dihydroterpinyl methyl ether, terpinyl methyl ether, α-terpinyl acetate, I-dihydrocarvyl acetate, I-menthone, I-menthyl acetate, I-perillyl acetate and I-carvyl acetate hardly dissolves the acrylic system resin contained in the ceramic green sheet as a binder. Therefore, even in the case of forming a release layer containing the same binder as that contained in the ceramic green sheet and printing a conductive paste on the release layer to form an electrode layer it is possible to reliably prevent the release layer from being swollen or partially dissolved so as to generate voids at the interface between the release layer and the electrode layer or generate fissures or wrinkles on the surface of the electrode layer and it is therefore possible to effectively prevent defects from being generated in a multi-layered ceramic electronic component such as a multi-layered ceramic capacitor.

Technical Advantages of the Invention

According to the present invention, it is possible to provide a conductive paste for a multi-layered ceramic electronic component which does not dissolve a binder contained in a layer adjacent to an electrode layer of the multi-layered ceramic electronic component, can reliably prevent short circuit failure from occurring in a multi-layered ceramic electronic component and has excellent printability.

Further, according to the present invention, it is possible to provide a method for manufacturing a multi-layered ceramic electronic component which can reliably prevent short circuit failure from occurring in a multi-layered ceramic electronic component and form an electrode layer in a desired manner.

DESCRIPTION OF THE PREFERRED EMBODIMENTS

In a preferred embodiment of the present invention, a dielectric paste for a ceramic green sheet which contains a butyral system resin as a binder is first prepared and is applied onto a long support sheet using an extrusion coater or a wire bar coater, thereby forming a coating layer. A dielectric paste for forming a ceramic green sheet is normally prepared by kneading a dielectric material (ceramic powder) and an organic vehicle obtained by dissolving a butyral system resin into an organic solvent.

It is preferable for the degree of polymerization of the butyral system resin to be equal to or larger than 1000.

Further, it is preferable for the degree of butyralization of butyral system resin to be equal to or larger than 64 mol % and equal to or smaller than 78 mol %.

An organic solvent used for preparing the organic vehicle is not particularly limited and an organic solvent such as terpineol, butyl carbitol, acetone, toluene, ethyl acetate and the like can be used for preparing the organic vehicle.

The dielectric material can be selected from among various compounds capable of forming a composite oxide or oxide, such as a carbonate, nitrate, hydroxide, organic metallic compound and the like and mixtures thereof. The dielectric material is normally used in the form of a powder whose average particle diameter is about 0.1 μm to about 3.0 μm. The particle diameter of the dielectric raw material is preferably smaller than the thickness of the ceramic green sheet.

The amounts of the respective constituents contained in the dielectric paste is not particularly limited and the dielectric paste may be prepared so as to contain 100 weight parts of a dielectric material, about 2.5 weight part to about 10 weight parts of a butyral system resin and about 50 weight parts to about 320 weight parts of a solvent, for example.

As occasion demands, the dielectric paste may contain additives selected from among various dispersing agents, plasticizing agents, antistatic auxiliary agent, releasing agent, wetting agent and the like. In the case of adding these additives to the dielectric paste, it is preferable to set the total content to be equal to or less than about 10 weight %.

As a support sheet coated with the dielectric paste, a polyethylene terephthalate film is employed, for example, and the surface of the support sheet may be coated with a silicon resin, an alkyd resin or the like in order to improve the releasability thereof.

The coating layer is then dried at a temperature of about 50° C. to about 100° C. for about 1 to about 20 minutes, whereby a ceramic green sheet is formed on the support sheet.

In the present invention, the thickness of the ceramic green sheet after drying is preferably equal to or thinner than 3 μm and more preferably equal to or thinner than 1.5 μm.

Next, a conductive paste for forming an electrode layer is printed on the ceramic green sheet formed on the long support sheet in a predetermined pattern using a screen printing machine, a gravure printing machine or the like.

It is preferable to form the electrode layer so as to have a dry thickness of about 0.1 μm to about 5 μm and it is more preferable to form the electrode layer so as to have a dry thickness of about 0.1 μm to about 1.5 μm.

The conductive paste usable for forming an electrode layer is prepared by kneading a conductive material containing any of various conductive metals or alloys, any of various oxides which will form a conductive material containing any of various conductive metals or alloys after baking, an organic metal compound, resinate or the like, and an organic vehicle prepared by dissolving a butyral system resin in an organic solvent.

In this preferred embodiment of the present invention, the conductive paste contains a binder containing ethyl cellulose having a weight average molecular weight of $MW_L$ and ethyl cellulose having a weight average molecular weight of $MW_H$ at a weight ratio of X:(1−X), where $MW_L$, $MW_H$ and X are selected so that $X*MW_L+(1-X)*MW_H$ falls within a range of 145,000 to 215,000 and at least one solvent selected from the group consisting of isobornyl acetate, dihydroterpinyl methyl ether, terpinyl methyl ether, α-terpinyl acetate, I-dihydrocarvyl acetate, I-menthone, I-menthyl acetate, I-perillyl acetate and I-carvyl acetate.

Since the solvent selected from the group consisting of isobornyl acetate, dihydroterpinyl methyl ether, terpinyl methyl ether, α-terpinyl acetate, I-dihydrocarvyl acetate, I-menthone, I-menthyl acetate, I-perillyl acetate and I-carvyl acetate hardly dissolves the butyral system resin contained in a ceramic green sheet as a binder, even in the case of printing the conductive paste on a very thin ceramic green sheet, thereby forming an electrode layer, it is possible to effectively prevent the binder contained in the ceramic green sheet from being dissolved by the solvent contained in the conductive paste, whereby the ceramic green sheet is swollen or partially dissolved. It is therefore possible to reliably prevent generation of pinholes and cracks in the ceramic green sheet even in the case where the ceramic green sheet is very thin.

Further, since a conductive paste containing a binder containing ethyl cellulose having a weight average molecular weight of $MW_L$ and ethyl cellulose having a weight average molecular weight of $MW_H$ at a weight ratio of X:(1−X), where $MW_L$, $MW_H$ and X are selected so that $X*MW_L+(1-X)*MW_H$ falls within a range of 145,000 to 215,000 and at least one solvent selected from the group consisting of isobornyl acetate, dihydroterpinyl methyl ether, terpinyl methyl ether, α-terpinyl acetate, I-dihydrocarvyl acetate, I-menthone, I-menthyl acetate, I-perillyl acetate and I-carvyl acetate has a viscosity suitable for printing, it is possible to print a conductive paste on a ceramic green sheet using a screen printing machine, a gravure printing machine or the like to form an electrode layer in a predetermined pattern in a desired manner.

Preferably, $MW_L$, $MW_H$ and X are selected so that $X*MW_L+(1-X)*MW_H$ falls within a range of 155,000 to 205,000.

As the conductive material used for preparing the conductive paste, Ni, Ni alloy or the mixture thereof is preferably used. The shape of the conductive material is not particularly limited. The conductive material particles may have a spherical shape or a scale-like shape, or the conductive material may contain spherical conductive material particles and scale-like conductive material particles. The average particle diameter of the conductive material is not particularly limited but a conductive material having an average particle diameter of about 0.1 μm to about 2 μm is normally used for preparing the electrode paste and the conductive material having an average particle diameter of about 0.2 μm to about 1 μm is preferably used for preparing the electrode paste.

The conductive paste preferably contains the binder in an amount about 2.5 weight parts to about 20 weight parts with respect to 100 weight parts of the conductive material.

The content of the solvent is preferably about 20 weight % to about 55 weight % with respect to the weight of the conductive paste.

In order to improve adhesion property, it is preferable for the conductive paste to contain a plasticizing agent. The plasticizing agent contained in the conductive paste is not particularly limited and illustrative examples thereof include phthalate ester, adipic acid, phosphate ester, glycols and the like. The conductive paste contains the plasticizing agent preferably in an amount of about 10 weight % to about 300 weight % with respect to 100 weight parts of the binder, more preferably in an amount of about 10 weight parts to about 200 weight parts. In the case where the amount of the plasticizing agent added to the conductive paste is too large, the strength of the electrode layer tends to be markedly lower.

As occasion demands, the conductive paste may contain additives selected from among various dispersing agents accessory ingredient compounds and the like.

In the present invention, preferably, prior to forming an electrode layer or after forming an electrode layer and drying it, a dielectric paste adapted for forming a spacer layer and containing a binder containing ethyl cellulose having a weight average molecular weight of $MW_L$ and ethyl cellulose having a weight average molecular weight of $MW_H$ at a weight ratio of X:(1−X), where $MW_L$, $MW_H$ and X are selected so that $X*MW_L+(1-X)*MW_H$ falls within a range of 110,000 to 180,000 and at least one solvent selected from the group consisting of isobornyl acetate, dihydroterpinyl methyl ether, terpinyl methyl ether, α-terpinyl acetate, I-dihydrocarvyl acetate, I-menthone, I-menthyl acetate, I-perillyl acetate and I-carvyl acetate is printed on the surface of a ceramic green sheet in a complementary pattern to that of the electrode layer using a screen printing machine, a gravure printing machine or the like, thereby forming a spacer layer.

In the case where a spacer layer is formed on the surface of a ceramic green sheet in a complementary pattern to that of the electrode layer in this manner; it is possible to prevent a step from being formed between the surface of the electrode layer and the surface of the ceramic green sheet where no electrode layer is formed. Therefore, even in the case of laminating a number of multi-layered units each including a ceramic green sheet and an electrode layer and fabricating a multi-layered electronic component such as a multi-layered ceramic capacitor, it is possible to effectively prevent the thus fabricated multi-layered electronic component from being deformed and also effectively prevent delamination of layers from occurring.

Furthermore, as described above, since the solvent selected from the group consisting of isobornyl acetate, dihydroterpinyl methyl ether, terpinyl methyl ether, α-terpinyl acetate, l-dihydrocarvyl acetate, l-menthone, l-menthyl acetate, l-perillyl acetate and l-carvyl acetate hardly dissolves the butyral system resin contained in the ceramic green sheet as a binder, it is possible to reliably prevent the ceramic green sheet from being swollen or partially dissolved so as to generate voids at the interface between the ceramic green sheet and the spacer layer or generate fissures or wrinkles on the surface of the spacer layer.

Moreover, since the dielectric paste containing a binder containing ethyl cellulose having a weight average molecular weight of $MW_L$ and ethyl cellulose having a weight average molecular weight of $MW_H$ at a weight ratio of X:(1−X), where $MW_L$, $MW_H$ and X are selected so that $X* MW_L+(1-X)*MW_H$ falls within a range of 110,000 to 180,000 and at least one solvent selected from the group consisting of isobornyl acetate, dihydroterpinyl methyl ether, terpinyl methyl ether, α-terpinyl acetate, l-dihydrocarvyl acetate, l-menthone, l-menthyl acetate, l-perillyl acetate and l-carvyl acetate has a viscosity suitable for printing, a spacer layer can be formed on a ceramic green sheet in a complimentary pattern to that of the electrode layer in a desired manner using a screen printing machine, a gravure printing machine or the like.

In this embodiment, the dielectric paste for forming the spacer layer is prepared in the similar manner to the dielectric paste for forming the ceramic green sheet except that different binder and solvent are used.

Then, the electrode layer or the electrode layer and the spacer layer are dried and a multi-layered unit including the ceramic green sheet and electrode layer or the electrode layer and the spacer layer laminated on the support sheet is fabricated.

When a multi-layered ceramic capacitor is to be fabricated, the support sheet is peeled off from the ceramic green sheet of the multi-layered unit and the multi-layered unit is diced to predetermined dimensions. Then, a predetermined number of the multi-layered units are laminated on the outer layer of a multi-layered ceramic capacitor and the other outer layer of a multi-layered ceramic capacitor is further laminated on the multi-layered units, thereby fabricating a laminated body. Next, the thus obtained laminated body is press molded and diced to predetermined dimensions, thereby fabricating ceramic green chips.

The thus fabricated ceramic green chips are placed in a reducing gas atmosphere so that the binder is removed therefrom and the ceramic green chips are baked.

Necessary external electrodes are then attached to the thus baked ceramic green chip, thereby manufacturing a multi-layered ceramic capacitor.

According to this embodiment, since the electrode layer is formed by printing the conductive paste containing a binder containing ethyl cellulose having a weight average molecular weight of $MW_L$ and ethyl cellulose having a weight average molecular weight of $MW_H$ at a weight ratio of X:(1−X), where $MW_L$, $MW_H$ and X are selected so that $X*MW_L+(1-X)*MW_H$ falls within a range of 145,000 to 215,000 and at least one solvent selected from the group consisting of isobornyl acetate, dihydroterpinyl methyl ether, terpinyl methyl ether, α-terpinyl acetate, l-dihydrocarvyl acetate, l-menthone, l-menthyl acetate, l-perillyl acetate and l-carvyl acetate on the ceramic green sheet containing a butyral system resin as a binder in a predetermined pattern and the solvent selected from the group consisting of isobornyl acetate, dihydroterpinyl methyl ether, terpinyl methyl ether, α-terpinyl acetate, l-dihydrocarvyl acetate, l-menthone, l-menthyl acetate, l-perillyl acetate and l-carvyl acetate hardly dissolves the butyral system resin contained in a ceramic green sheet as a binder. As a result, even in the case of printing the conductive paste on a very thin ceramic green sheet, thereby forming an electrode layer, it is possible to reliably prevent the binder contained in the ceramic green sheet from being dissolved by the solvent contained in the conductive paste and the ceramic green sheet from being swollen or partially dissolved. Therefore, even in the case where a ceramic green sheet is very thin, it is possible to effectively prevent generation of pinholes or cracks in the ceramic green sheet and it is therefore possible to effectively prevent short circuit failure from occurring in a multi-layered ceramic capacitor fabricated by laminating a number of multi-layered units.

Further, according to this embodiment, the spacer layer is formed by printing the dielectric paste containing a binder containing ethyl cellulose having a weight average molecular weight of $MW_L$ and ethyl cellulose having a weight average molecular weight of $MW_H$ at a weight ratio of X:(1−X), where $MW_L$, $MW_H$ and X are selected so that $X*MW_L+(1-X)*MW_H$ falls within a range of 110,000 to 180,000 and at least one solvent selected from the group consisting of isobornyl acetate, dihydroterpinyl methyl ether, terpinyl methyl ether, α-terpinyl acetate, l-dihydrocarvyl acetate, l-menthone, l-menthyl acetate, l-perillyl acetate and l-carvyl acetate on the ceramic green sheet containing a butyral system resin as a binder in a complementary pattern to that of the electrode layer and the solvent selected from the group consisting of isobornyl acetate, dihydroterpinyl methyl ether, terpinyl methyl ether, α-terpinyl acetate, l-dihydrocarvyl acetate, l-menthone, l-menthyl acetate, l-perillyl acetate and l-carvyl acetate hardly dissolves the butyral system resin contained in a ceramic green sheet as a binder. As a result, even in the case of printing the dielectric paste on a very thin ceramic green sheet, thereby forming a spacer layer, it is possible to reliably prevent the binder contained in the ceramic green sheet from being dissolved by the solvent contained in the dielectric paste and the ceramic green sheet from being swollen or partially dissolved so as to generate voids at the interface between the ceramic green sheet and the spacer layer or generate fissures or wrinkles on the surface of the spacer layer. Therefore, in the case where a multi-layered ceramic capacitor is fabricated by laminating a number of multi-layered units each including a ceramic green sheet and an electrode layer, it is possible to reliably prevent voids from being generated in the multi-layered ceramic capacitor and it is also possible to reliably prevent the portions of the spacer layer where fissures or wrinkles are generated from dropping off during lamination of a number of the multi-layered units to fabricate the laminated body and mixing into the laminated body as a foreign substance so as to cause internal defects in the multi-layered ceramic capacitor.

In another preferred embodiment of the present invention, a second support sheet is provided separately from the long support sheet used for forming the ceramic green sheet and the surface of the long second support sheet is coated using a wire bar coater or the like with a dielectric paste containing particles of a dielectric material having substantially the same composition as that of the dielectric material contained in the ceramic green sheet and the same binder as that contained in the ceramic green sheet, thereby forming a coating layer and the coating layer is dried to form a release layer.

As the second support sheet, a polyethylene terephthalate film is employed, for example, and the surface of the second support sheet may be coated with a silicon resin, an alkyd resin or the like in order to improve the releasability thereof.

The thickness of the release layer is preferably equal to or thinner than that of an electrode layer, more preferably equal to or thinner than about 60% of the electrode layer thickness and most preferably equal to or thinner than about 30% of the electrode layer thickness.

After the release layer has been dried, the conductive paste for an electrode layer prepared in the above described manner is printed on the surface of the release layer in a predetermined pattern using a screen printing machine, a gravure printing machine or the like, thereby forming an electrode layer.

It is preferable to form the electrode layer so as to have a thickness of about 0.1 µm to about 5 µm and it is more preferable to form the electrode layer so as to have a thickness of about 0.1 µm to about 1.5 µm.

In this embodiment, the conductive paste contains a binder containing ethyl cellulose having a weight average molecular weight of $MW_L$ and ethyl cellulose having a weight average molecular weight of $MW_H$ at a weight ratio of $X:(1-X)$, where $MW_L$, $MW_H$ and X are selected so that $X*MW_L+(1-X)*MW_H$ falls within a range of 145,000 to 215,000 and at least one solvent selected from the group consisting of isobornyl acetate, dihydroterpinyl methyl ether, terpinyl methyl ether, α-terpinyl acetate, I-dihydrocarvyl acetate, I-menthone, I-menthyl acetate, I-perillyl acetate and I-carvyl acetate.

Since the solvent selected from the group consisting of isobornyl acetate, dihydroterpinyl methyl ether, terpinyl methyl ether, α-terpinyl acetate, I-dihydrocarvyl acetate, I-menthone, I-menthyl acetate, I-perillyl acetate and I-carvyl acetate hardly dissolves the butyral system resin contained in a ceramic green sheet as a binder, even in the case of forming a release layer containing the same binder as that of the ceramic green sheet and printing the conductive paste on the release layer to form an electrode layer, it is possible to effectively prevent the release layer from being swollen or partially dissolved so as to generate voids at the interface between the release layer and the electrode layer or generate fissures or wrinkles on the surface of the electrode layer.

Further, since the conductive paste containing a binder containing ethyl cellulose having a weight average molecular weight of $MW_L$ and ethyl cellulose having a weight average molecular weight of $MW_H$ at a weight ratio of $X:(1-X)$, where $MW_L$, $MW_H$ and X are selected so that $X* MW_L+(1-X)*MW_H$ falls within a range of 145,000 to 215,000 and at least one solvent selected from the group consisting of isobornyl acetate, dihydroterpinyl methyl ether, terpinyl methyl ether, α-terpinyl acetate, I-dihydrocarvyl acetate, I-menthone, I-menthyl acetate, I-perillyl acetate and I-carvyl acetate has a viscosity suitable for printing, an electrode layer can be formed on the release layer in a predetermined pattern using a screen printing machine, a gravure printing machine or the like in a desired manner.

Preferably, $MW_L$, $MW_H$ and X are selected so that $X*MW_L+(1-X)*MW_H$ falls within a range of 155,000 to 205,000.

In the present invention, preferably, prior to forming an electrode layer or after forming an electrode layer and drying it, a dielectric paste containing a binder containing ethyl cellulose having a weight average molecular weight of $MW_L$ and ethyl cellulose having a weight average molecular weight of $MW_H$ at a weight ratio of $X:(1-X)$, where $MW_L$, $MW_H$ and X are selected so that $X*MW_L+(1-X)*MW_H$ falls within a range of 110,000 to 180,000 and at least one solvent selected from the group consisting of isobornyl acetate, dihydroterpinyl methyl ether, terpinyl methyl ether, α-terpinyl acetate, I-dihydrocarvyl acetate, I-menthone, I-menthyl acetate, I-perillyl acetate and I-carvyl acetate and prepared in the above described manner is printed on the surface of the release layer in a complementary pattern to that of the electrode layer using a screen printing machine, a gravure printing machine or the like, thereby forming a spacer layer.

In the case where the spacer layer is formed on the surface of a release layer in a complementary pattern to that of the electrode layer in this manner, it is possible to prevent a step from being formed between the surface of the electrode layer and the surface of the release layer where no electrode layer is formed. Therefore, even in the case of laminating a number of multi-layered units each including a ceramic green sheet and an electrode layer and fabricating a multi-layered electronic component such as a multi-layered ceramic capacitor, it is possible to effectively prevent the thus fabricated multi-layered electronic component from being deformed and also effectively prevent delamination of layers from occurring.

Further, as described above, since the solvent selected from the group consisting of isobornyl acetate, dihydroterpinyl methyl ether, terpinyl methyl ether, α-terpinyl acetate, I-dihydrocarvyl acetate, I-menthone, I-menthyl acetate, I-perillyl acetate and I-carvyl acetate hardly dissolves the butyral system resin contained in the ceramic green sheet as a binder, even in the case of forming the release layer containing the same binder as that of the ceramic green sheet and printing a dielectric paste on the release layer to form a spacer layer, it is possible to effectively prevent the release layer from being swollen or partially dissolved so as to generate voids at the interface between the release layer and the spacer layer or generate fissures or wrinkles on the surface of the spacer layer.

Further, since the dielectric paste containing a binder containing ethyl cellulose having a weight average molecular weight of $MW_L$ and ethyl cellulose having a weight average molecular weight of $MW_H$ at a weight ratio of $X:(1-X)$, where $MW_L$, $MW_H$ and X are selected so that $X* MW_L+(1-X)*MW_H$ falls within a range of 110,000 to 180,000 and at least one solvent selected from the group consisting of isobornyl acetate, dihydroterpinyl methyl ether, terpinyl methyl ether, α-terpinyl acetate, I-dihydrocarvyl acetate, I-menthone, I-menthyl acetate, I-perillyl acetate and I-carvyl acetate has a viscosity suitable for printing, a spacer layer can be formed on the surface of the release layer in a complementary pattern to that of the electrode layer using a screen printing machine, a gravure printing machine or the like in a desired manner.

Furthermore, a long third support sheet is provided and the surface of the third support sheet is coated with an adhesive agent solution using a bar coater, an extrusion coater, a reverse coater, a dip coater, a kiss coater or the like and the coating layer is dried, thereby forming an adhesive layer.

It is preferable for the adhesive agent solution to contain a binder belonging to the same group as that the binder contained in the ceramic green sheet belongs to, particles of a dielectric material having substantially the same composition as that of dielectric particles contained in the ceramic green sheet, a plasticizing agent, an antistatic agent and a release agent.

It is preferable to form an adhesive layer so as to have a thickness thinner than about 0.3 µm, more preferable to form it so as to have a thickness of about 0.02 µm to about 0.3 µm and particularly preferable to form it so as to have a thickness of about 0.02 µm to about 0.2 µm.

The adhesive layer formed on the long third support sheet in this manner is bonded onto the surface of the electrode layer or the surfaces of the electrode layer and the spacer layer formed on the long second support sheet or the surface of the ceramic green sheet formed on the support sheet and the third support sheet then is peeled off from the adhesive layer, whereby the adhesive layer is transferred onto the surface of the electrode layer or the surfaces of the electrode layer and the spacer layer or the surface of the ceramic green sheet.

In the case where the adhesive layer is transferred onto the surface of the electrode layer or the surfaces of the electrode layer and the spacer layer, the ceramic green sheet formed on the long support sheet is bonded onto the adhesive layer and the first support sheet is peeled off from the ceramic green sheet so that the ceramic green sheet is transferred onto the surface of the adhesive layer, thereby fabricating a multi-layered unit including the ceramic green sheet and the electrode layer or the electrode layer and the spacer layer.

An adhesive layer is transferred onto the surface of the ceramic green sheet of the thus fabricated multi-layered unit in a similar manner to that of transferring the adhesive layer onto the surface of the electrode layer or the surfaces of the electrode layer and the spacer layer and the multi-layered unit including the adhesive layer transferred onto the surface thereof is diced to predetermined dimensions.

Similarly, a predetermined number of multi-layered units each including the adhesive layer transferred onto the surface thereof are fabricated and the predetermined number of multi-layered units are laminated, thereby fabricating a multi-layered block.

When a multi-layered block is to be fabricated, the multi-layered unit is first positioned on a support formed of polyethylene terephthalate or the like in such a manner that the adhesive layer transferred onto the surface of the multi-layered unit comes into contact with the support and the multi-layered unit is pressed by a pressing machine or the like, whereby the multi-layered unit is bonded onto the support via the adhesive layer.

Afterwards, the second support sheet is peeled off from the release layer and the multi-layered unit is laminated on the support.

Then, a new multi-layered unit is positioned on the surface of the release layer of the multi-layered unit laminated on the support in such a manner that an adhesive layer formed on the new multi-layered unit comes into contact with the surface of the release layer and the multi-layered unit is pressed using a pressing machine or the like, whereby the new multi-layered unit is laminated on the surface of the release layer of the multi-layered unit laminated on the support via the adhesive layer. Afterwards, the second support sheet is peeled off from the release layer of the new multi-layered unit.

Similar processes are repeated, thereby fabricating a multi-layered block including a predetermined number of the laminated multi-layered units.

On the other hand, in the case where the adhesive layer is transferred onto the surface of the ceramic green sheet, the electrode layer or the electrode layer and the spacer layer formed on the second support sheet are bonded onto the adhesive layer and then, the second support sheet is peeled off from the release layer, the electrode layer or the electrode layer and the spacer layer and the release layer are transferred onto the surface of the adhesive layer. Thus, a multi-layered unit including the ceramic green sheet and the electrode layer is fabricated.

An adhesive layer is transferred onto the surface of the release layer of the thus obtained multi-layered unit in a similar manner to that of transferring the adhesive layer onto the surface of the ceramic green sheet and the multi-layered unit including the adhesive layer transferred onto the surface thereof is diced to predetermined dimensions.

Similarly, a predetermined number of multi-layered units each including the adhesive layer transferred onto the surface thereof are fabricated and the predetermined number of multi-layered units are laminated, thereby fabricating a multi-layered block.

When a multi-layered block is to be fabricated, the multi-layered unit is first positioned on a support formed of polyethylene terephthalate or the like in such a manner that the adhesive layer transferred onto the surface of the multi-layered unit comes into contact with the support and the multi-layered unit is pressed by a pressing machine or the like, whereby the multi-layered unit is bonded onto the support via the adhesive layer.

Afterwards, the support sheet is peeled off from the ceramic green sheet and the multi-layered unit is laminated on the support.

Then, a new multi-layered unit is positioned on the surface of the ceramic green sheet of the multi-layered unit laminated on the support in such a manner that an adhesive layer formed on the new multi-layered unit comes into contact with the surface of the ceramic green sheet and the multi-layered unit is pressed using a pressing machine or the like, whereby the new multi-layered unit is laminated on the surface of the ceramic green sheet of the multi-layered unit laminated on the support via the adhesive layer. Afterwards, the support sheet is peeled off from the release layer of the new multi-layered unit.

Similar processes are repeated, thereby fabricating a multi-layered block including a predetermined number of the laminated multi-layered units.

The thus fabricated multi-layered block including the predetermined number of the laminated multi-layered units is laminated on the outer layer of a multi-layered ceramic capacitor and the other outer layer of a multi-layered ceramic capacitor is further laminated on the multi-layered block, thereby fabricating a laminated body. Next, the thus obtained laminated body is press molded and diced to predetermined dimensions, thereby fabricating a number of ceramic green chips.

The thus fabricated ceramic green chips are placed in a reducing gas atmosphere so that the binder is removed therefrom and the ceramic green chips are baked.

Necessary external electrodes are then attached to the thus baked ceramic green chip, thereby manufacturing a multi-layered ceramic capacitor.

According to this preferred embodiment, since the electrode layer and the spacer layer formed on the second support sheet are dried and then bonded onto the surface of the ceramic green sheet via the adhesive layer, unlike in the case of printing a conductive paste on the surface of the ceramic green sheet to form an electrode layer and printing a dielectric paste on the surface of the ceramic green sheet to form a spacer layer, it is possible to prevent the conductive paste and the dielectric paste from permeating into the ceramic green sheet and it is therefore possible to laminate the electrode layer and the spacer layer on the surface of the ceramic green sheet in a desired manner.

Furthermore, according to this preferred embodiment, the electrode layer is formed using the conductive paste containing a binder containing ethyl cellulose having a weight average molecular weight of $MW_L$ and ethyl cellulose having a weight average molecular weight of $MW_H$ at a weight ratio of $X:(1-X)$, where $MW_L$, $MW_H$ and $X$ are selected so that $X*MW_L+(1-X)*MW_H$ falls within a range of 145,000 to 215,000 and at least one solvent selected from the group consisting of isobornyl acetate, dihydroterpinyl methyl ether, terpinyl methyl ether, α-terpinyl acetate, I-dihydrocarvyl acetate, I-menthone, I-menthyl acetate, I-perillyl acetate and I-carvyl acetate and the solvent selected from the group consisting of isobornyl acetate, dihydroterpinyl methyl ether, terpinyl methyl ether, α-terpinyl acetate, I-dihydrocarvyl acetate, I-menthone, I-menthyl acetate, I-perillyl acetate and I-carvyl acetate hardly dissolves a butyral system resin contained in a ceramic green sheet as a binder. As a result, even in the case of forming the release layer containing the same binder as that contained in a ceramic green sheet and printing the conductive paste on the release layer, thereby forming an electrode layer, it is possible to effectively prevent the release layer from being swollen or partially dissolved so as to generate pinholes or cracks in the release layer and effectively prevent defects from being generated in a multi-layered ceramic capacitor.

Further, according to this preferred embodiment, the spacer layer is formed using the dielectric paste containing a binder containing ethyl cellulose having a weight average molecular weight of $MW_L$ and ethyl cellulose having a weight average molecular weight of $MW_H$ at a weight ratio of $X:(1-X)$, where $MW_L$, $MW_H$ and $X$ are selected so that $X*MW_L + (1-X)*MW_H$ falls within a range of 110,000 to 180,000 and at least one solvent selected from the group consisting of isobornyl acetate, dihydroterpinyl methyl ether, terpinyl methyl ether, α-terpinyl acetate, I-dihydrocarvyl acetate, I-menthone, I-menthyl acetate, I-perillyl acetate and I-carvyl acetate and the solvent selected from the group consisting of isobornyl acetate, dihydroterpinyl methyl ether, terpinyl methyl ether, α-terpinyl acetate, I-dihydrocarvyl acetate, I-menthone, I-menthyl acetate, I-perillyl acetate and I-carvyl acetate hardly dissolves a butyral system resin contained in a ceramic green sheet as a binder. As a result, even in the case of forming a release layer containing the same binder as that contained in the ceramic green sheet and printing a dielectric paste on the surface of the release layer, thereby forming a spacer layer, it is possible to effectively prevent the release layer from being swollen or partially dissolved so as to generate voids at the interface between the release layer and the spacer layer or generate fissures or wrinkles on the surface of the spacer layer. Therefore, in the case where a multi-layered ceramic capacitor is fabricated by laminating a number of multi-layered units each including a ceramic green sheet and an electrode layer, it is possible to reliably prevent voids from being generated in the multi-layered ceramic capacitor and it is also possible to reliably prevent the portions of the spacer layer where fissures or wrinkles are generated from dropping off during lamination of a number of the multi-layered units to fabricate the laminated body and mixing into the laminated body as a foreign substance so as to cause internal defects in the multi-layered ceramic capacitor.

Moreover, according to this preferred embodiment, since it is possible to prevent the release layer from being swollen or partially dissolved, thereby changing the release strength between the release layer and the electrode layer and the spacer layer or the release layer and the electrode layer, it is possible to effectively prevent defects from being generated when a multi-layered unit is fabricated.

In a further preferred embodiment, in the case where the adhesive layer is transferred onto the surface of the electrode layer or the surfaces of the electrode layer and the spacer layer, an adhesive layer is transferred onto the surface of a ceramic green sheet of a multi-layered unit fabricated by laminating a release layer, an electrode layer or an electrode layer and a spacer layer, an adhesive layer and a ceramic green sheet on a long second support sheet and without cutting the multi-layered unit, a release layer of another multi-layered unit fabricated by laminating a ceramic green sheet, an adhesive layer, an electrode layer or an electrode layer and a spacer layer, and the release layer on a long support sheet is bonded onto the adhesive layer and the support sheet is peeled off from the ceramic green sheet, whereby two multi-layered units are laminated on the long second support sheet.

Then, an adhesive layer formed on a third support sheet is transferred onto the ceramic green sheet located on the side of the surface of the laminated two multi-layered units and a release layer of another multi-layered unit fabricated by laminating a ceramic green sheet, an adhesive layer, an electrode layer or an electrode layer and a spacer layer, and the release layer on a long support sheet is bonded onto the adhesive layer and the support sheet is peeled off from the release layer.

Similar processes are repeated, thereby fabricating a multi-layered unit set including a predetermined number of laminated multi-layered units. Further, an adhesive layer formed on the third support sheet is transferred onto the surface of the ceramic green sheet located on the side of the surface of the multi-layered unit set, thereby fabricating a laminated body and the laminated body is diced to predetermined dimensions, thereby fabricating a multi-layered blocks.

On the other hand, in the case where the adhesive layer is transferred onto the surface of the ceramic green sheet, an adhesive layer is transferred onto the surface of a release layer of a multi-layered unit fabricated by laminating a ceramic green sheet, an adhesive layer, an electrode layer or an electrode layer and a spacer layer, and the release layer on a long support sheet and without cutting the multi-layered unit, a ceramic green sheet of another multi-layered unit fabricated by laminating a release layer, an electrode layer or an electrode layer and a spacer layer, an adhesive layer and a ceramic green sheet on a long second support sheet is bonded onto the adhesive layer and the second support sheet is peeled off from the release layer, whereby two multi-layered units are laminated on the long second support sheet.

Then, an adhesive layer formed on a third support sheet is transferred onto the release layer located on the side of the surface of the laminated two multi-layered units and a ceramic green sheet of a multi-layered unit fabricated by laminating a release layer, an electrode layer or an electrode layer and a spacer layer, an adhesive layer and a ceramic green sheet on a long second support sheet is further laminated on the adhesive layer. Then, the second support sheet is peeled off from the release layer.

Similar processes are repeated, thereby fabricating a multi-layered unit set including a predetermined number of laminated multi-layered units. Further, an adhesive layer formed on the third support sheet is transferred onto the surface of the release layer located on the side of the surface of the multi-layered unit set, thereby fabricating a laminated body and the laminated body is diced to predetermined dimensions, thereby fabricating multi-layered blocks.

A multi-layered ceramic capacitor is fabricated using the thus fabricated multi-layered blocks in the manner of the previous preferred embodiment.

According to this preferred embodiment, since the multi-layered units are successively laminated on the long second support sheet or support sheet, thereby fabricating the multi-layered unit set including a predetermined number of multi-layered units and the multi-layered unit set is diced to predetermined dimensions, thereby fabricating multi-layered blocks, it is possible to markedly improve the manufacturing efficiency of the multi-layered blocks in comparison with the case where multi-layered blocks are fabricated by laminating multi-layered units each of which has been diced to predetermined dimensions.

In a further preferred embodiment of the present invention, in the case where the adhesive layer is transferred onto the surface of the electrode layer or the surfaces of the electrode layer and the spacer layer, an adhesive layer is transferred onto the surface of a ceramic green sheet of a multi-layered unit fabricated by laminating a release layer, an electrode layer or an electrode layer and a spacer layer, an adhesive layer and a ceramic green sheet on a long second support sheet and without cutting the multi-layered unit, an electrode layer or an electrode layer and a spacer layer formed on the second support sheet are bonded onto the adhesive layer and the second support sheet is peeled off from the release layer, whereby the electrode layer and the spacer layer, and the release layer are transferred onto the surface of the adhesive layer.

Then, an adhesive layer formed on a third support sheet is transferred onto the surface of the release layer transferred onto the adhesive layer, a ceramic green sheet formed on the support sheet is bonded onto the adhesive layer and the support sheet is peeled off from the ceramic green sheet, whereby the ceramic green sheet is transferred onto the surface of the adhesive layer.

Further, an adhesive layer formed on a third support sheet is transferred onto the surface of the ceramic green sheet transferred onto the surface of the adhesive layer, an electrode layer or an electrode layer and a spacer layer formed on the second support sheet are bonded onto the adhesive layer and the second support sheet is peeled off from the release layer, whereby the electrode layer or the electrode layer and the spacer layer, and the release layer are transferred onto the surface of the adhesive layer.

Similar processes are repeated, thereby fabricating a multi-layered unit set including a predetermined number of laminated multi-layered units. Further, an adhesive layer formed on the third support sheet is transferred onto the surface of the ceramic green sheet located on the side of the surface of the multi-layered unit set, thereby fabricating a laminated body and the laminated body is diced to predetermined dimensions, thereby fabricating multi-layered blocks.

On the other hand, in the case where the adhesive layer is transferred onto the surface of the ceramic green sheet, an adhesive layer is transferred onto the surface of a release layer of a multi-layered unit fabricated by laminating a ceramic green sheet, an adhesive layer, an electrode layer or an electrode layer and a spacer layer, and the release layer on a long support sheet and without cutting the multi-layered unit, a ceramic green sheet of a support sheet is bonded onto the adhesive layer and the support sheet is peeled off from the ceramic green sheet, whereby the ceramic green sheet is transferred onto the adhesive layer.

Further, an adhesive layer formed on the third support sheet is transferred onto the ceramic green sheet transferred onto the adhesive layer and an electrode layer or an electrode layer and a spacer layer formed on the second support sheet are bonded onto the adhesive layer. Then, the second support sheet is peeled off from the release layer, whereby the electrode layer or the electrode layer and the spacer layer, and the release layer are transferred onto the surface of the adhesive layer.

Furthermore, an adhesive layer formed on the third support sheet is transferred onto the release layer transferred onto the adhesive layer and a ceramic green sheet formed on the support sheet is bonded onto the adhesive layer. Then, the support sheet is peeled off from the ceramic green sheet, whereby the ceramic green sheet is transferred onto the surface of the adhesive layer.

Similar processes are repeated, thereby fabricating a multi-layered unit set including a predetermined number of laminated multi-layered units. Further, an adhesive layer is transferred onto the surface of the release layer located on the side of the surface of the multi-layered unit set, thereby fabricating a laminated body and the laminated body is diced to predetermined dimensions, thereby fabricating multi-layered blocks.

A multi-layered ceramic green sheet is fabricated using the thus fabricated multi-layered block in the manner of the previous embodiment.

According to this preferred embodiment, the transferring of the adhesive layer, the transferring of the electrode layer or the electrode layer and the spacer layer and the release layer, the transferring of the adhesive layer and the transferring of the ceramic green sheet onto the long second support sheet or support sheet are repeated, thereby successively laminating the multi-layered units to fabricate the multi-layered unit set including a predetermined number of multi-layered units and the multi-layered unit set is diced to predetermined dimensions, thereby fabricating multi-layered blocks. As a result, it is possible to markedly improve the manufacturing efficiency of the multi-layered block in comparison with the case where multi-layered blocks are fabricated by laminating multi-layered units each of which has been diced to predetermined dimensions.

Hereinafter, working examples and comparative examples will be set out in order to further clarify the advantages of the present invention.

WORKING EXAMPLES

Working Example 1

Preparation of a Dielectric Paste for Forming a Ceramic Green Sheet 1.48 weight parts of $(BaCa)SiO_3$, 1.01 weight parts of $Y_2O_3$, 0.72 weight part of $MgCO_3$, 0.13 weight part of $MnO$ and 0.045 weight part of $V_2O_5$ were mixed, thereby preparing an additive powder.

72.3 weight parts of ethyl alcohol, 72.3 weight parts of propyl alcohol, 25.8 weight parts of xylene and 0.93 weight parts of polyethylenglycol system dispersing agent were added to 100 weight parts of the thus prepared additive powder to prepare a slurry and the additives contained in the slurry were pulverized.

When the additives contained in the slurry were to be pulverized, 11.65 grams of the slurry and 450 grams of $ZrO_2$ beads having a diameter of 2 mm were charged in a polyethylene vessel having an inner volume of 250 cc and the polyethylene vessel was rotated at the circumferential velocity of 45 m/min for sixteen hours, thereby pulverizing the additive powder to prepare the additive slurry.

The median diameter of the additives after pulverization was 0.1 μm.

Then, 15 weight parts of polyvinyl butyral whose degree of polymerization was 1450 and degree of butyralization was 69 mol % was dissolved into a mixture of 42.5 weight parts of ethyl alcohol and 42.5 weight parts of propyl alcohol at 50° C., thereby preparing a 15% organic vehicle solution. Further, a slurry having the composition set out below was mixed with the organic vehicle solution for twenty hours using a ball mill having an inner volume of 500 cc, thereby preparing a dielectric paste. When the slurry was to be mixed with the organic vehicle solution, 330.1 grams of the slurry and 900 grams of $ZrO_2$ beads having a diameter of 2 mm were charged in the polyethylene vessel and the polyethylene vessel was rotated at the circumferential velocity of 45 m/min.

| | |
|---|---|
| $BaTiO_3$ powders ("BT-02" (Product Name) manufactured by SAKAI CHEMICAL INDUSTRY CO., LTD.: particle diameter 0.2 μm) | 100 weight parts |
| additive slurry | 11.65 weight parts |
| ethyl alcohol | 35.32 weight parts |
| propyl alcohol | 35.32 weight parts |
| xylene | 16.32 weight parts |
| benzyl butyl phthalate (plasticizing agent) | 2.61 weight parts |
| mineral sprit | 7.3 weight parts |
| polyethylene glycol system dispersing agent | 2.36 weight parts |
| imidazoline system antistatic auxiliary agent | 0.42 weight parts |
| organic vehicle | 33.74 weight parts |
| methyl ethyl ketone | 43.81 weight parts |
| 2-butoxyethyl alcohol | 43.81 weight parts |

As a polyethylene glycol system dispersing agent, a dispersing agent which was obtained by denaturing polyethylene glycol with aliphatic acid and whose hydrophile-liophile balance (HLB) was 5 to 6 was employed.

Formation of a Ceramic Green Sheet

A polyethylene terephthalate film was coated with the thus prepared dielectric paste using a die coater at a coating velocity of 50 m/minutes, thereby forming a coating layer and the thus formed coating layer was dried in a drying furnace whose temperature was held at 80° C., thereby forming a ceramic-green sheet having a thickness of 1 μm.

Preparation of a Conductive Paste for Forming an Electrode Layer 1.48 weight parts of $(BaCa)SiO_3$, 1.01 weight parts of $Y_2O_3$, 0.72 weight part of $MgCO_3$, 0.13 weight part of MnO and 0.045 weight part of $V_2O_5$ were mixed, thereby preparing an additive powder.

150 weight parts of acetone, 104.3 weight parts of isobornyl acetate and 1.5 weight parts of polyethylene glycol system dispersing agent were added to 100 weight parts of the thus prepared additive powder to prepare a slurry and the additives contained in the slurry were pulverized using a pulverizer "LMZ0.6" (Product name) manufactured by Ashizawa Finetech Co., Ltd.

When the additives contained in the slurry were to be pulverized, $ZrO_2$ beads having a diameter of 0.1 mm were charged into a vessel so as to occupy 80 volume % of the vessel, the vessel was rotated at the circumferential velocity of 14 m/min and the slurry was circulated between the vessel and a slurry tank until holding time of the whole slurry of two liters became 30 minutes, thereby pulverizing the additives contained in the slurry.

The median diameter of the additives after pulverization was 0.1 μm.

Then, acetone was evaporated using an evaporator and removed from the slurry, thereby preparing an additive paste in which the additives were dispersed in terpineol. The concentration of the additives contained in the additive paste was 49.3 weight %.

Then, 8 weight parts of a binder containing ethyl cellulose having a weight average molecular weight ($MW_H$) of 230,000 and ethyl cellulose having a weight average molecular weight (MWI) of 130,000 at a weight ratio of 75:25, namely, 8 weight parts of ethyl cellulose having an apparent weight average molecular weight of 205,000 defined as $X*MW_L + (1-X)*MW_H$, was dissolved in 92 weight parts of isobornyl acetate at 70° C., thereby preparing an 8% organic vehicle solution. Further, a slurry having the composition set out below was dispersed in the organic vehicle solution for sixteen hours using a ball mill. The dispersing conditions were set so that the amount of charged $ZrO_2$ having a diameter of 2.0 mm was 30 volume % of the ball mill, the amount of the slurry in the ball mill was 60 volume % and the circumferential velocity of the ball mill was 45 m/min.

| | |
|---|---|
| nickel powder manufactured by Kawatetsu Industry Co., Ltd. and having a particle diameter of 0.2 μm | 100 weight parts |
| additive paste | 1.77 weight parts |
| $BaTiO_3$ powder manufactured by SAKAI CHEMICAL INDUSTRY CO., LTD. | 19.14 weight parts |
| organic vehicle | 56.25 weight parts |
| polyethylene glycol system dispersing agent | 1.19 weight parts |
| isobornyl acetate | 32.19 weight parts |
| acetone | 56 weight parts |

Then, acetone was evaporated using a stirring device having an evaporator and a heating mechanism and removed from the slurry, thereby preparing a conductive paste. The concentration of the dielectric material contained in the conductive paste was 47 weight %.

The viscosity of the thus obtained conductive paste was measured using a rheometer manufactured by HAAKE Co., Ltd. under conditions of a temperature of 25° C. and shearing velocity of 8 $sec^{-1}$ and was also measured under conditions of a temperature of 25° C. and shearing velocity of 50 $sec^{-1}$.

As a result, it was found that the viscosity of the conductive paste measured under condition of the shearing velocity of 8 $sec^{-1}$ was 19.4 Ps·s and that the viscosity of the conductive paste measured under condition of the shearing velocity of 50 $sec^{-1}$ was 10.4 Ps·s.

Formation of an Electrode Layer and Fabrication of a Multi-layered Unit

The thus prepared conductive paste was printed on the ceramic green sheet using a screen printing machine and dried at 90° C. for five minutes, thereby forming an electrode layer having a thickness of 1 μm. Thus, a multi-layered unit including the ceramic green sheet and the electrode layer laminated on the polyethylene terephthalate film was fabricated.

The surface roughness (Ra) of the thus formed electrode layer was measured using the "SURFCORDER (SE-30D)" (Product Name) manufactured by Kosaka Laboratory Ltd. As a result, it was found that the surface roughness (Ra) of the electrode layer was 0.124 μm and that the electrode layer having a high surface smoothness was formed.

Fabrication of a Ceramic Green Chip

The surface of a polyethylene terephthalate film was coated with the dielectric paste prepared in the above described manner using a die coater, thereby forming a coating layer, and the coating layer was dried, thereby forming a ceramic green sheet having a thickness of 10 μm.

The thus formed ceramic green sheet was peeled off from the polyethylene terephthalate film and diced. Five of the diced ceramic green sheet units were laminated to form a cover layer having a thickness of 50 μm. Further, the multi-layered unit was peeled off from the polyethylene terephthalate film and diced and fifty of the diced multi-layered units were laminated on the cover layer.

Then, the ceramic green sheet having a thickness of 10 μm was peeled off from the polyethylene terephthalate film and diced and five of the ceramic green sheet units were laminated on the multi-layered units laminated on the cover layer, thereby fabricating a laminated body including the lower cover layer having a thickness of 50 μm, an active layer having a thickness of 100 μm and including the laminated fifty multi-layered units each including the ceramic green sheet having a thickness of 1 μm and the electrode layer having a thickness of 1 μm, and an upper cover layer having a thickness of 50 μm.

Further, a pressure of 100 MPa was applied onto the thus fabricated laminated body at 70° C., thereby press molding the laminated body and the laminated body was diced to predetermined dimensions using a dicing machine, thereby fabricating ceramic green chips.

Fabrication of a Multi-Layered Ceramic Capacitor Sample

The thus fabricated ceramic green chip was processed under the following conditions in an air atmosphere to remove the binder.

Rate of temperature increase: 50° C./hour

Holding temperature: 240° C.

Holding time period: 8 hours

After removing the binder, the ceramic green chip was processed and baked under the following conditions in a mixed gas atmosphere of a nitrogen gas and a hydrogen gas whose temperature was controlled at the dew point 20° C. The contents of the nitrogen gas and the hydrogen gas contained in the mixed gas were 95 volume % and 5 volume %, respectively.

Rate of temperature increase: 300° C./hour
Holding temperature: 1200° C.
Holding time period: 2 hours
Cooling rate: 300° C./hour The thus baked ceramic green chip was subjected to an annealing treatment under the following conditions in a nitrogen gas atmosphere whose temperature was controlled at the dew point 20° C.

Rate of temperature increase: 300° C./hour
Holding temperature: 1000° C.
Holding time period: 3 hours
Cooling rate: 300° C./hour End surfaces of the thus obtained sintered body were polished by the sandblast and coated with In—Ga alloy, thereby forming a terminal electrode. Thus, a multi-layered ceramic capacitor sample was fabricated.

A total of fifty multi-layered ceramic capacitor samples were fabricated in a manner similar to the foregoing.

Measurement of a Short-circuit Failure Ratio

The resistance value of each of the thus fabricated multi-layered ceramic capacitor samples was measured using a multi-meter to check whether or not short-circuit failure occurred therein.

In the case where the thus measured resistance value was equal to or lower than 100 KΩ, it was judged that short-circuit failure occurred in the multi-layered ceramic capacitor sample. The number of the ceramic capacitor samples in which short-circuit failure occurred was measured and the ratio of the number of the ceramic capacitor samples in which short-circuit failure occurred to the total number of the fabricated multi-layered ceramic capacitor samples was calculated and defined as the short-circuit failure ratio.

As a result, the short-circuit failure ratio of the multi-layered ceramic capacitor samples was found to be 12%, so that the risk of short-circuit failure could be considered insignificant from the practical viewpoint.

Working Example 2

A conductive paste was prepared in the manner of Working Example 1 except that a binder containing ethyl cellulose having a weight average molecular weight ($MW_H$) of 230,000 and ethyl cellulose having a weight average molecular weight (MWl) of 130,000 at a weight ratio of 50:50, namely, ethyl cellulose having an apparent weight average molecular weight of 180,000 defined as $X*MW_L+(1-X):*MW_H$, was used and the viscosity of the thus prepared conductive paste was measured under conditions of a temperature of 25° C. and shearing velocity of 8 $sec^{-1}$ and was also measured under conditions of a temperature of 25° C. and shearing velocity of 50 $sec^{-1}$.

As a result, it was found that the viscosity of the conductive paste measured under condition of the shearing velocity of 8 $sec^{-1}$ was 15.5 Ps·s and that the viscosity of the conductive paste measured under condition of the shearing velocity of 50 $sec^{-1}$ was 8.5 Ps·s.

Then, the thus prepared conductive paste was printed on a ceramic green sheet fabricated in the manner of Working Example 1 using a screen printing machine, thereby forming an electrode layer having a thickness of 1 μm. Thus, a multi-layered unit including the ceramic green sheet and the electrode layer laminated on the polyethylene terephthalate film was fabricated.

The surface roughness (Ra) of the thus formed electrode layer was measured using the "SURFCORDER (SE-30D)" (Product Name) manufactured by Kosaka Laboratory Ltd. in the manner of Working Example 1. As a result, it was found that the surface roughness (Ra) of the electrode layer was 0.089 μm and that the electrode layer having a high surface smoothness was formed.

Further, a total of fifty multi-layered ceramic capacitor samples were fabricated and the resistance value of each of the thus fabricated multi-layered ceramic capacitor samples was measured using a multi-meter in a manner of Working Example 1 to check whether or not short-circuit failure occurred therein. As a result, the short-circuit failure ratio of the multi-layered ceramic capacitor samples was found to be 4%, so that the risk of short-circuit failure could be considered insignificant from the practical viewpoint.

Working Example 3

A conductive paste was prepared in the manner of Working Example 1 except that a binder containing ethyl cellulose having a weight average molecular weight ($MW_H$) of 230,000 and ethyl cellulose having a weight average molecular weight ($MW_L$) of 130,000 at a weight ratio of 25:75, namely, ethyl cellulose having an apparent weight average molecular weight of 155,000 defined as $X*MW_L+(1-X):*MW_H$, was used and the viscosity of the thus prepared conductive paste was measured under conditions of a temperature of 25° C. and shearing velocity of 8 $sec^{-1}$ and was also measured under conditions of a temperature of 25° C. and shearing velocity of 50 $sec^{-1}$.

As a result, it was found that the viscosity of the conductive paste measured under condition of the shearing velocity of 8 $sec^{-1}$ was 11.2 Ps·s and that the viscosity of the conductive paste measured under condition of the shearing velocity of 50 $sec^{-1}$ was 6.8 Ps·s.

Then, the thus prepared conductive paste was printed on a ceramic green sheet fabricated in the manner of Working Example 1 using a screen printing machine, thereby forming an electrode layer having a thickness of 1 μm. Thus, a multi-layered unit including the ceramic green sheet and the electrode layer laminated on the polyethylene terephthalate film was fabricated.

The surface roughness (Ra) of the thus formed electrode layer was measured using the "SURFCORDER (SE-30D)" (Product Name) manufactured by Kosaka Laboratory Ltd. in the manner of Working Example 1. As a result, it was found that the surface roughness (Ra) of the electrode layer was 0.065 μm and that the electrode layer having a high surface smoothness was formed.

Further, a total of fifty multi-layered ceramic capacitor samples were fabricated and the resistance value of each of the thus fabricated multi-layered ceramic capacitor samples was measured using a multi-meter in a manner of Working Example 1 to check whether or not short-circuit failure occurred therein. As a result, the short-circuit failure ratio of the multi-layered ceramic capacitor samples was found to be 4%, so that the risk of short-circuit failure could be considered insignificant from the practical viewpoint.

Working Example 4

A conductive paste was prepared in the manner of Working Example 1 except that dihydroterpinyl methyl ether was used as a solvent instead of isobornyl acetate and the viscosity of the thus prepared conductive paste was measured under conditions of a temperature of 25° C. and shearing velocity of 8 $sec^{-1}$ and was also measured under conditions of a temperature of 25° C. and shearing velocity of 50 $sec^{-1}$.

As a result, it was found that the viscosity of the conductive paste measured under condition of the shearing velocity of 8 $sec^{-1}$ was 16.1 Ps·s and that the viscosity of the conductive paste measured under condition of the shearing velocity of 50 $sec^{-1}$ was 9.3 Ps·s.

Then, the thus prepared conductive paste was printed on a ceramic green sheet fabricated in the manner of Working Example 1 using a screen printing machine, thereby forming an electrode layer having a thickness of 1 μm. Thus, a multi-layered unit including the ceramic green sheet and the electrode layer laminated on the polyethylene terephthalate film was fabricated.

The surface roughness (Ra) of the thus formed electrode layer was measured using the "SURFCORDER (SE-30D)" (Product Name) manufactured by Kosaka Laboratory Ltd. in the manner of Working Example 1. As a result, it was found that the surface roughness (Ra) of the electrode layer was 0.111 μm and that the electrode layer having a high surface smoothness was formed.

Further, a total of fifty multi-layered ceramic capacitor samples were fabricated and the resistance value of each of the thus fabricated multi-layered ceramic capacitor samples was measured using a multi-meter in a manner of Working Example 1 to check whether or not short-circuit failure occurred therein. As a result, the short-circuit failure ratio of the multi-layered ceramic capacitor samples was found to be 12%, so that the risk of short-circuit failure could be considered insignificant from the practical viewpoint.

Working Example 5

A conductive paste was prepared in the manner of Working Example 4 except that a binder containing ethyl cellulose having a weight average molecular weight ($MW_H$) of 230,000 and ethyl cellulose having a weight average molecular weight ($MW_L$) of 130,000 at a weight ratio of 50:50 was used and the viscosity of the thus prepared conductive paste was measured under conditions of a temperature of 25° C. and shearing velocity of 8 $sec^{-1}$ and was also measured under conditions of a temperature of 25° C. and shearing velocity of 50 $sec^{-1}$.

As a result, it was found that the viscosity of the conductive paste measured under condition of the shearing velocity of 8 $sec^{-1}$ was 12.3 Ps·s and that the viscosity of the conductive paste measured under condition of the shearing velocity of 50 $sec^{-1}$ was 7.3 Ps·s.

Then, the thus prepared conductive paste was printed on a ceramic green sheet fabricated in the manner of Working Example 1 using a screen printing machine, thereby forming an electrode layer having a thickness of 1 μm. Thus, a multi-layered unit including the ceramic green sheet and the electrode layer laminated on the polyethylene terephthalate film was fabricated.

The surface roughness (Ra) of the thus formed electrode layer was measured using the "SURFCORDER (SE-30D)" (Product Name) manufactured by Kosaka Laboratory Ltd. in the manner of Working Example 1. As a result, it was found that the surface roughness (Ra) of the electrode layer was 0.066 μm and that the electrode layer having a high surface smoothness was formed.

Further, a total of fifty multi-layered ceramic capacitor samples were fabricated and the resistance value of each of the thus fabricated multi-layered ceramic capacitor samples was measured using a multi-meter in a manner of Working Example 1 to check whether or not short-circuit failure occurred therein. As a result, the short-circuit failure ratio of the multi-layered ceramic capacitor samples was found to be 12%, so that the risk of short-circuit failure could be considered insignificant from the practical viewpoint.

Working Example 6

A conductive paste was prepared in the manner of Working Example 4 except that a binder containing ethyl cellulose having a weight average molecular weight ($MW_H$) of 230,000 and ethyl cellulose having a weight average molecular weight ($MW_L$) of 130,000 at a weight ratio of 25:75 was used and the viscosity of the thus prepared conductive paste was measured under conditions of a temperature of 25° C. and shearing velocity of 8 $sec^{-1}$ and was also measured under conditions of a temperature of 25° C. and shearing velocity of 50 $sec^{-1}$.

As a result, it was found that the viscosity of the conductive paste measured under condition of the shearing velocity of 8 $sec^{-1}$ was 8.6 Ps·s and that the viscosity of the conductive paste measured under condition of the shearing velocity of 50 $sec^{-1}$ was 5.3 Ps·s.

Then, the thus prepared conductive paste was printed on a ceramic green sheet fabricated in the manner of Working Example 1 using a screen printing machine, thereby forming an electrode layer having a thickness of 1 μm. Thus, a multi-layered unit including the ceramic green sheet and the electrode layer laminated on the polyethylene terephthalate film was fabricated.

The surface roughness (Ra) of the thus formed electrode layer was measured using the "SURFCORDER (SE-30D)" (Product Name) manufactured by Kosaka Laboratory Ltd. in the manner of Working Example 1. As a result, it was found that the surface roughness (Ra) of the electrode layer was 0.068 μm and that the electrode layer having a high surface smoothness was formed.

Further, a total of fifty multi-layered ceramic capacitor samples were fabricated and the resistance value of each of the thus fabricated multi-layered ceramic capacitor samples was measured using a multi-meter in a manner of Working Example 1 to check whether or not short-circuit failure occurred therein. As a result, the short-circuit failure ratio of the multi-layered ceramic capacitor samples was found to be 8%, so that the risk of short-circuit failure could be considered insignificant from the practical viewpoint.

Working Example 7

A conductive paste was prepared in the manner of Working Example 1 except that terpinyl methyl ether was used as a solvent instead of isobornyl acetate and the viscosity of the thus prepared conductive paste was measured under conditions of a temperature of 25° C. and shearing velocity of 8 $sec^{-1}$ and was also measured under conditions of a temperature of 25° C. and shearing velocity of 50 $sec^{-1}$.

As a result, it was found that the viscosity of the conductive paste measured under condition of the shearing velocity of 8 $sec^{-1}$ was 15.6 Ps·s and that the viscosity of the conductive paste measured under condition of the shearing velocity of 50 $sec^{-1}$ was 9.0 Ps·s.

Then, the thus prepared conductive paste was printed on a ceramic green sheet fabricated in the manner of Working Example 1 using a screen printing machine, thereby forming an electrode layer having a thickness of 1 μm. Thus, a multi-layered unit including the ceramic green sheet and the electrode layer laminated on the polyethylene terephthalate film was fabricated.

The surface roughness (Ra) of the thus formed electrode layer was measured using the "SURFCORDER (SE-30D)" (Product Name) manufactured by Kosaka Laboratory Ltd. in the manner of Working Example 1. As a result, it was found that the surface roughness (Ra) of the electrode layer was 0.071 μm and that the electrode layer having a high surface smoothness was formed.

Further, a total of fifty multi-layered ceramic capacitor samples were fabricated and the resistance value of each of the thus fabricated multi-layered ceramic capacitor samples was measured using a multi-meter in a manner of Working Example 1 to check whether or not short-circuit failure occurred therein. As a result, the short-circuit failure ratio of the multi-layered ceramic capacitor samples was found to be 12%, so that the risk of short-circuit failure could be considered insignificant from the practical viewpoint.

Working Example 8

A conductive paste was prepared in the manner of Working Example 7 except that a binder containing ethyl cellulose having a weight average molecular weight ($MW_H$) of 230,000 and ethyl cellulose having a weight average molecular weight ($MW_L$) of 130,000 at a weight ratio of 50:50 was used as a binder of the conductive paste and the viscosity of the thus prepared conductive paste was measured under conditions of a temperature of 25° C. and shearing velocity of 8 $sec^{-1}$ and was also measured under conditions of a temperature of 25° C. and shearing velocity of 50 $sec^{-1}$.

As a result, it was found that the viscosity of the conductive paste measured under condition of the shearing velocity of 8 $sec^{-1}$ was 11.7 Ps·s and that the viscosity of the conductive paste measured under condition of the shearing velocity of 50 $sec^{-1}$ was 6.6 Ps·s.

Then, the thus prepared conductive paste was printed on a ceramic green sheet fabricated in the manner of Working Example 1 using a screen printing machine, thereby forming an electrode layer having a thickness of 1 μm. Thus, a multi-layered unit including the ceramic green sheet and the electrode layer laminated on the polyethylene terephthalate film was fabricated.

The surface roughness (Ra) of the thus formed electrode layer was measured using the "SURFCORDER (SE-30D)" (Product Name) manufactured by Kosaka Laboratory Ltd. in the manner of Working Example 1. As a result, it was found that the surface roughness (Ra) of the electrode layer was 0.068 μm and that the electrode layer having a high surface smoothness was formed.

Further, a total of fifty multi-layered ceramic capacitor samples were fabricated and the resistance value of each of the thus fabricated multi-layered ceramic capacitor samples was measured using a multi-meter in a manner of Working Example 1 to check whether or not short-circuit failure occurred therein. As a result, the short-circuit failure ratio of the multi-layered ceramic capacitor samples was found to be 14%, so that the risk of short-circuit failure could be considered insignificant from the practical viewpoint.

Working Example 9

A conductive paste was prepared in the manner of Working Example 7 except that a binder containing ethyl cellulose having a weight average molecular weight ($MW_H$) of 230,000 and ethyl cellulose having a weight average molecular weight ($MW_L$) of 130,000 at a weight ratio of 25:75 was used as a binder of the conductive paste and the viscosity of the thus prepared conductive paste was measured under conditions of a temperature of 25° C. and shearing velocity of 8 $sec^{-1}$ and was also measured under conditions of a temperature of 25° C. and shearing velocity of 50 $sec^{-1}$.

As a result, it was found that the viscosity of the conductive paste measured under condition of the shearing velocity of 8 $sec^{-1}$ was 8.3 Ps·s and that the viscosity of the conductive paste measured under condition of the shearing velocity of 50 $sec^{-1}$ was 4.78 Ps·s.

Then, the thus prepared conductive paste was printed on a ceramic green sheet fabricated in the manner of Working Example 1 using a screen printing machine, thereby forming an electrode layer having a thickness of 1 μm. Thus, a multi-layered unit including the ceramic green sheet and the electrode layer laminated on the polyethylene terephthalate film was fabricated.

The surface roughness (Ra) of the thus formed electrode layer was measured using the "SURFCORDER (SE-30D)" (Product Name) manufactured by Kosaka Laboratory Ltd. in the manner of Working Example 1. As a result, it was found that the surface roughness (Ra) of the electrode layer was 0.066 μm and that the electrode layer having a high surface smoothness was formed.

Further, a total of fifty multi-layered ceramic capacitor samples were fabricated and the resistance value of each of the thus fabricated multi-layered ceramic capacitor samples was measured using a multi-meter in a manner of Working Example 1 to check whether or not short-circuit failure occurred therein. As a result, the short-circuit failure ratio of the multi-layered ceramic capacitor samples was found to be 6%, so that the risk of short-circuit failure could be considered insignificant from the practical viewpoint.

Working Example 10

A conductive paste was prepared in the manner of Working Example 2 except that α-terpinyl acetate was used as a solvent instead of isobornyl acetate and the viscosity of the thus prepared conductive paste was measured under conditions of a temperature of 25° C. and shearing velocity of 8 $sec^{-1}$ and was also measured under conditions of a temperature of 25° C. and shearing velocity of 50 $sec^{-1}$.

As a result, it was found that the viscosity of the conductive paste measured under condition of the shearing velocity of 8 $sec^{-1}$ was 12.0 Ps·s and that the viscosity of the conductive paste measured under condition of the shearing velocity of 50 $sec^{-1}$ was 5.9 Ps·s.

Then, the thus prepared conductive paste was printed on a ceramic green sheet fabricated in the manner of Working Example 1 using a screen printing machine, thereby forming an electrode layer having a thickness of 1 μm. Thus, a multi-layered unit including the ceramic green sheet and the electrode layer laminated on the polyethylene terephthalate film was fabricated.

The surface roughness (Ra) of the thus formed electrode layer was measured using the "SURFCORDER (SE-30D)" (Product Name) manufactured by Kosaka Laboratory Ltd. in the manner of Working Example 1. As a result, it was found that the surface roughness (Ra) of the electrode layer was 0.061 μm and that the electrode layer having a high surface smoothness was formed.

Further, a total of fifty multi-layered ceramic capacitor samples were fabricated and the resistance value of each of the thus fabricated multi-layered ceramic capacitor samples was measured using a multi-meter in a manner of Working Example 1 to check whether or not short-circuit failure occurred therein. As a result, the short-circuit failure ratio of the multi-layered ceramic capacitor samples was found to be 8%, so that the risk of short-circuit failure could be considered insignificant from the practical viewpoint.

Working Example 11

A conductive paste was prepared in the manner of Working Example 2 except that I-dihydrocarvyl acetate was used as a solvent instead of isobornyl acetate and the viscosity of the thus prepared conductive paste was measured under conditions of a temperature of 25° C. and shearing velocity of 8 $sec^{-1}$ and was also measured under conditions of a temperature of 25° C. and shearing velocity of 50 $sec^{-1}$.

As a result, it was found that the viscosity of the conductive paste measured under condition of the shearing velocity of 8 $sec^{-1}$ was 11.5 Ps·s and that the viscosity of the conductive paste measured under condition of the shearing velocity of 50 $sec^{-1}$ was 6.6 Ps·s.

Then, the thus prepared conductive paste was printed on a ceramic green sheet fabricated in the manner of Working Example 1 using a screen printing machine, thereby forming an electrode layer having a thickness of 1 μm. Thus, a multi-layered unit including the ceramic green sheet and the electrode layer laminated on the polyethylene terephthalate film was fabricated.

The surface roughness (Ra) of the thus formed electrode layer was measured using the "SURFCORDER (SE-30D)" (Product Name) manufactured by Kosaka Laboratory Ltd. in the manner of Working Example 1. As a result, it was found that the surface roughness (Ra) of the electrode layer was 0.072 μm and that the electrode layer having a high surface smoothness was formed.

Further, a total of fifty multi-layered ceramic capacitor samples were fabricated and the resistance value of each of the thus fabricated multi-layered ceramic capacitor samples was measured using a multi-meter in a manner of Working Example 1 to check whether or not short-circuit failure occurred therein. As a result, the short-circuit failure ratio of the multi-layered ceramic capacitor samples was found to be 18%, so that the risk of short-circuit failure could be considered insignificant from the practical viewpoint.

Working Example 12

A conductive paste was prepared in the manner of Working Example 2 except that I-menthone was used as a solvent instead of isobornyl acetate and the viscosity of the thus prepared conductive paste was measured under conditions of a temperature of 25° C. and shearing velocity of 8 $sec^{-1}$ and was also measured under conditions of a temperature of 25° C. and shearing velocity of 50 $sec^{-1}$.

As a result, it was found that the viscosity of the conductive paste measured under condition of the shearing velocity of 8 $sec^{-1}$ was 12.4 Ps·s and that the viscosity of the conductive paste measured under condition of the shearing velocity of 50 $sec^{-1}$ was 6.7 Ps·s.

Then, the thus prepared conductive paste was printed on a ceramic green sheet fabricated in the manner of Working Example 1 using a screen printing machine, thereby forming an electrode layer having a thickness of 1 μm. Thus, a multi-layered unit including the ceramic green sheet and the electrode layer laminated on the polyethylene terephthalate film was fabricated.

The surface roughness (Ra) of the thus formed electrode layer was measured using the "SURFCORDER (SE-30D)" (Product Name) manufactured by Kosaka Laboratory Ltd. in the manner of Working Example 1. As a result, it was found that the surface roughness (Ra) of the electrode layer was 0.061 μm and that the electrode layer having a high surface smoothness was formed.

Further, a total of fifty multi-layered ceramic capacitor samples were fabricated and the resistance value of each of the thus fabricated multi-layered ceramic capacitor samples was measured using a multi-meter in a manner of Working Example 1 to check whether or not short-circuit failure occurred therein. As a result, the short-circuit failure ratio of the multi-layered ceramic capacitor samples was found to be 6%, so that the risk of short-circuit failure could be considered insignificant from the practical viewpoint.

Working Example 13

A conductive paste was prepared in the manner of Working Example 2 except that I-menthyl acetate was used as a solvent instead of isobornyl acetate and the viscosity of the thus prepared conductive paste was measured under conditions of a temperature of 25° C. and shearing velocity of 8 $sec^{-1}$ and was also measured under conditions of a temperature of 25° C. and shearing velocity of 50 $sec^{-1}$.

As a result, it was found that the viscosity of the conductive paste measured under condition of the shearing velocity of 8 $sec^{-1}$ was 10.6 Ps·s and that the viscosity of the conductive paste measured under condition of the shearing velocity of 50 $sec^{-1}$ was 5.8 Ps·s.

Then, the thus prepared conductive paste was printed on a ceramic green sheet fabricated in the manner of Working Example 1 using a screen printing machine, thereby forming an electrode layer having a thickness of 1 μm. Thus, a multi-layered unit including the ceramic green sheet and the electrode layer laminated on the polyethylene terephthalate film was fabricated.

The surface roughness (Ra) of the thus formed electrode layer was measured using the "SURFCORDER (SE-30D)" (Product Name) manufactured by Kosaka Laboratory Ltd. in the manner of Working Example 1. As a result, it was found that the surface roughness (Ra) of the electrode layer was 0.059 μm and that the electrode layer having a high surface smoothness was formed.

Further, a total of fifty multi-layered ceramic capacitor samples were fabricated and the resistance value of each of the thus fabricated multi-layered ceramic capacitor samples was measured using a multi-meter in a manner of Working Example 1 to check whether or not short-circuit failure occurred therein. As a result, the short-circuit failure ratio of the multi-layered ceramic capacitor samples was found to be 14%, so that the risk of short-circuit failure could be considered insignificant from the practical viewpoint.

Working Example 14

A conductive paste was prepared in the manner of Working Example 2 except that I-perillyl acetate was used as a solvent instead of isobornyl acetate and the viscosity of the thus prepared conductive paste was measured under conditions of a temperature of 25° C. and shearing velocity of 8 $sec^{-1}$ and was also measured under conditions of a temperature of 25° C. and shearing velocity of 50 $sec^{-1}$.

As a result, it was found that the viscosity of the conductive paste measured under condition of the shearing velocity of 8 $sec^{-1}$ was 11.8 Ps·s and that the viscosity of the conductive paste measured under condition of the shearing velocity of 50 $sec^{-1}$ was 6.1 Ps·s. As a result, it was found that the viscosity of the conductive paste measured under condition of the shearing velocity of 8 $sec^{-1}$ was 11.8 Ps·s and that the viscosity of the conductive paste measured under condition of the shearing velocity of 50 $sec^{-1}$ was 6.1 Ps·s.

Then, the thus prepared conductive paste was printed on a ceramic green sheet fabricated in the manner of Working Example 1 using a screen printing machine, thereby forming an electrode layer having a thickness of 1 μm. Thus, a multi-layered unit including the ceramic green sheet and the electrode layer laminated on the polyethylene terephthalate film was fabricated.

The surface roughness (Ra) of the thus formed electrode layer was measured using the "SURFCORDER (SE-30D)" (Product Name) manufactured by Kosaka Laboratory Ltd. in the manner of Working Example 1. As a result, it was found that the surface roughness (Ra) of the electrode layer was 0.069 μm and that the electrode layer having a high surface smoothness was formed.

Further, a total of fifty multi-layered ceramic capacitor samples were fabricated and the resistance value of each of the thus fabricated multi-layered ceramic capacitor samples was measured using a multi-meter in a manner of Working Example 1 to check whether or not short-circuit failure occurred therein. As a result, the short-circuit failure ratio of the multi-layered ceramic capacitor samples was found to be 12%, so that the risk of short-circuit failure could be considered insignificant from the practical viewpoint.

Working Example 15

A conductive paste was prepared in the manner of Working Example 2 except that I-carvyl acetate was used as a solvent instead of isobornyl acetate and the viscosity of the thus prepared conductive paste was measured under conditions of a temperature of 25° C. and shearing velocity of 8 sec$^{-1}$ and was also measured under conditions of a temperature of 25° C. and shearing velocity of 50 sec$^{-1}$.

As a result, it was found that the viscosity of the conductive paste measured under condition of the shearing velocity of 8 sec$^{-1}$ was 10.9 Ps·s and that the viscosity of the conductive paste measured under condition of the shearing velocity of 50 sec$^{-1}$ was 5.9 Ps·s.

Then, the thus prepared conductive paste was printed on a ceramic green sheet fabricated in the manner of Working Example 1 using a screen printing machine, thereby forming an electrode layer having a thickness of 1 μm. Thus, a multi-layered unit including the ceramic green sheet and the electrode layer laminated on the polyethylene terephthalate film was fabricated.

The surface roughness (Ra) of the thus formed electrode layer was measured using the "SURFCORDER (SE-30D)" (Product Name) manufactured by Kosaka Laboratory Ltd. in the manner of Working Example 1. As a result, it was found that the surface roughness (Ra) of the electrode layer was 0.059 μm and that the electrode layer having a high surface smoothness was formed.

Further, a total of fifty multi-layered ceramic capacitor samples were fabricated and the resistance value of each of the thus fabricated multi-layered ceramic capacitor samples was measured using a multi-meter in a manner of Working Example 1 to check whether or not short-circuit failure occurred therein. As a result, the short-circuit failure ratio of the multi-layered ceramic capacitor samples was found to be 8%, so that the risk of short-circuit failure could be considered insignificant from the practical viewpoint.

COMPARATIVE EXAMPLES

Comparative Example 1

A conductive paste was prepared in the manner of Working Example 1 except that ethyl cellulose having a weight average molecular weight of 230,000 was used as a binder of a conductive paste and the viscosity of the thus prepared conductive paste was measured under conditions of a temperature of 25° C. and shearing velocity of 8 sec$^{-1}$ and was also measured under conditions of a temperature of 25° C. and shearing velocity of 50 sec$^{-1}$.

As a result, it was found that the viscosity of the conductive paste measured under condition of the shearing velocity of 8 sec$^{-1}$ was 23.2 Ps·s and that the viscosity of the conductive paste measured under condition of the shearing velocity of 50 sec$^{-1}$ was 12.1 Ps·s.

Then, the thus prepared conductive paste was printed on a ceramic green sheet fabricated in the manner of Working Example 1 using a screen printing machine, thereby forming an electrode layer having a thickness of 1 μm. Thus, a multi-layered unit including the ceramic green sheet and the electrode layer laminated on the polyethylene terephthalate film was fabricated.

The surface roughness (Ra) of the thus formed electrode layer was measured using the "SURFCORDER (SE-30D)" (Product Name) manufactured by Kosaka Laboratory Ltd. in the manner of Working Example 1. As a result, it was found that the surface roughness (Ra) of the electrode layer was 0.210 μm, that is, the surface roughness of the electrode layer was high, so that an electrode layer having a high surface smoothness could not be formed.

It was reasonable to conclude that this was because the viscosity of the conductive paste at the shearing velocity of 50 sec$^{-1}$ was too high to print the conductive paste in a desired manner.

Further, a total of fifty multi-layered ceramic capacitor samples were fabricated and the resistance value of each of the thus fabricated multi-layered ceramic capacitor samples was measured using a multi-meter in a manner of Working Example 1 to check whether or not short-circuit failure occurred therein. As a result, the short-circuit failure ratio of the multi-layered ceramic capacitor samples was found to be 36% and it was found that the short-circuit failure was very high.

Comparative Example 2

A conductive paste was prepared in the manner of Working Example 1 except that ethyl cellulose having a weight average molecular weight of 130,000 was used as a binder of the conductive paste and the viscosity of the thus prepared conductive paste was measured under conditions of a temperature of 25° C. and shearing velocity of 8 sec$^{-1}$ and was also measured under conditions of a temperature of 25° C. and shearing velocity of 50 sec$^{-1}$.

As a result, it was found that the viscosity of the conductive paste measured under condition of the shearing velocity of 8 sec$^{-1}$ was 7.1 Ps·s and that the viscosity of the conductive paste measured under condition of the shearing velocity of 50 sec$^{-1}$ was 4.7 Ps·s.

Then, the thus prepared conductive paste was printed on a ceramic green sheet fabricated in the manner of Working Example 1 using a screen printing machine, thereby forming an electrode layer having a thickness of 1 μm. Thus, a multi-layered unit including the ceramic green sheet and the electrode layer laminated on the polyethylene terephthalate film was fabricated.

The surface roughness (Ra) of the thus formed electrode layer was measured using the "SURFCORDER (SE-30D)" (Product Name) manufactured by Kosaka Laboratory Ltd. in the manner of Working Example 1. As a result, it was found that the surface roughness (Ra) of the electrode layer was 0.071 μm, i.e., that the surface smoothness of the electrode layer was high. However, it was found that since the viscosity of the conductive paste at the shearing velocity of 50 sec$^{-1}$ was too low and the fluidity of the conductive paste was too high, the conductive paste leaked from a screen printing plate and the electrode layer could not be formed in a desired pattern.

Comparative Example 3

A dielectric paste for forming a ceramic green sheet was prepared in the manner of Working Example 1 except that butyral system resin whose degree of polymerization was 800 and degree of butyralization was 69 mol % was used as a binder of the dielectric paste for forming a ceramic green sheet, thereby forming a ceramic green sheet.

Further, a conductive paste was prepared in the manner of Working Example 2 and the viscosity of the thus prepared dielectric paste for forming a ceramic green sheet was measured under conditions of a temperature of 25° C. and shearing velocity of 8 sec$^{-1}$ and was also measured under conditions of a temperature of 25° C. and shearing velocity of 50 sec$^{-1}$.

As a result, it was found that the viscosity of the conductive paste measured under condition of the shearing velocity of 8 sec$^{-1}$ was 15.5 Ps·s and that the viscosity of the conductive paste measured under condition of the shearing velocity of 50 sec$^{-1}$ was 9.8 Ps·s.

Then, the thus prepared conductive paste was printed on a ceramic green sheet fabricated in the manner of Working Example 1 using a screen printing machine, thereby forming an electrode layer having a thickness of 1 μm. Thus, a multi-layered unit including the ceramic green sheet and the electrode layer laminated on the polyethylene terephthalate film was fabricated.

The surface roughness (Ra) of the thus formed electrode layer was measured using the "SURFCORDER (SE-30D)" (Product Name) manufactured by Kosaka Laboratory Ltd. in the manner of Working Example 1. As a result, it was found that the surface roughness (Ra) of the electrode layer was 0.073 μm and that the electrode layer having a high surface smoothness was formed.

Further, a total of fifty multi-layered ceramic capacitor samples were fabricated and the resistance value of each of the thus fabricated multi-layered ceramic capacitor samples was measured using a multi-meter in the manner of Working Example 1 to check whether or not short-circuit failure occurred therein. As a result, the short-circuit failure ratio of the multi-layered ceramic capacitor samples was found to be 30% and it was found that the short-circuit failure was so high that the samples were of no practical use.

Comparative Example 4

A conductive paste was prepared in the manner of Working Example 4 except that ethyl cellulose having a weight average molecular weight of 230,000 was used as a binder of the conductive paste and the viscosity of the thus prepared conductive paste was measured under conditions of a temperature of 25° C. and shearing velocity of 8 sec$^{-1}$ and was also measured under conditions of a temperature of 25° C. and shearing velocity of 50 sec$^{-1}$.

As a result, it was found that the viscosity of the conductive paste measured under condition of the shearing velocity of 8 sec$^{-1}$ was 20.3 Ps·s and that the viscosity of the conductive paste measured under condition of the shearing velocity of 50 sec$^{-1}$ was 11.3 Ps·s.

Then, the thus prepared conductive paste was printed on a ceramic green sheet fabricated in the manner of Working Example 1 using a screen printing machine, thereby forming an electrode layer having a thickness of 1 μm. Thus, a multi-layered unit including the ceramic green sheet and the electrode layer laminated on the polyethylene terephthalate film was fabricated.

The surface roughness (Ra) of the thus formed electrode layer was measured using the "SURFCORDER (SE-30D)" (Product Name) manufactured by Kosaka Laboratory Ltd. in the manner of Working Example 1. As a result, it was found that the surface roughness (Ra) of the electrode layer was 0.220 μm and that since the surface roughness of the electrode layer was too high, the electrode layer having a high surface smoothness could not be formed.

It was reasonable to conclude that this was because the viscosity of the conductive paste at the shearing velocity of 50 sec$^{-1}$ was too high to print the conductive paste in a desired manner.

Further, a total of fifty multi-layered ceramic capacitor samples were fabricated and the resistance value of each of the thus fabricated multi-layered ceramic capacitor samples was measured using a multi-meter in a manner of Working Example 1 to check whether or not short-circuit failure occurred therein. As a result, the short-circuit failure ratio of the multi-layered ceramic capacitor samples was found to be 34% and it was found that the short-circuit failure was very high.

Comparative Example 5

A conductive paste was prepared in the manner of Working Example 4 except that ethyl cellulose having a weight average molecular weight of 130,000 was used as a binder of the conductive paste and the viscosity of the thus prepared conductive paste was measured under conditions of a temperature of 25° C. and shearing velocity of 8 sec$^{-1}$ and was also measured under conditions of a temperature of 25° C. and shearing velocity of 50 sec$^{-1}$.

As a result, it was found that the viscosity of the conductive paste measured under condition of the shearing velocity of 8 sec$^{-1}$ was 5.3 Ps·s and that the viscosity of the conductive paste measured under condition of the shearing velocity of 50 sec$^{-1}$ was 3.2 Ps·s.

Then, the thus prepared conductive paste was printed on a ceramic green sheet fabricated in the manner of Working Example 1 using a screen printing machine, thereby forming an electrode layer having a thickness of 1 μm. Thus, a multi-layered unit including the ceramic green sheet and the electrode layer laminated on the polyethylene terephthalate film was fabricated.

The surface roughness (Ra) of the thus formed electrode layer was measured using the "SURFCORDER (SE-30D)" (Product Name) manufactured by Kosaka Laboratory Ltd. in the manner of Working Example 1. As a result, it was found that the surface roughness (Ra) of the electrode layer was 0.064 μm and that the surface smoothness of the electrode layer was high. However, it was found that since the viscosity of the conductive paste at the shearing velocity of 50 sec$^{-1}$ was too low and the fluidity of the conductive paste was too high, the conductive paste leaked from a screen printing plate and the electrode layer could not be formed in a desired pattern.

Comparative Example 6

A dielectric paste for forming a ceramic green sheet was prepared in the manner of Working Example 1 except that butyral system resin whose degree of polymerization was 800 and degree of butyralization was 69 mol % was used as a binder of the dielectric paste for forming a ceramic green sheet, thereby forming a ceramic green sheet.

Further, a conductive paste was prepared in the manner of Working Example 5 and the viscosity of the thus prepared dielectric paste for forming a ceramic green sheet was measured under conditions of a temperature of 25° C. and shearing velocity of 8 sec$^{-1}$ and was also measured under conditions of a temperature of 25° C. and shearing velocity of 50 sec$^{-1}$.

As a result, it was found that the viscosity of the conductive paste measured under condition of the shearing velocity of 8 sec$^{-1}$ was 12.3 Ps·s and that the viscosity of the conductive paste measured under condition of the shearing velocity of 50 sec$^{-1}$ was 7.3 Ps·s.

Then, the thus prepared conductive paste was printed on a ceramic green sheet fabricated in the manner of Working Example 1 using a screen printing machine, thereby forming an electrode layer having a thickness of 1 μm. Thus, a multi-layered unit including the ceramic green sheet and the electrode layer laminated on the polyethylene terephthalate film was fabricated.

The surface roughness (Ra) of the thus formed electrode layer was measured using the "SURFCORDER (SE-30D)" (Product Name) manufactured by Kosaka Laboratory Ltd. in the manner of Working Example 1. As a result, it was found that the surface roughness (Ra) of the electrode layer was 0.078 μm and that the electrode layer having a high surface smoothness was formed.

Further, a total of fifty multi-layered ceramic capacitor samples were fabricated and the resistance value of each of the thus fabricated multi-layered ceramic capacitor samples was measured using a multi-meter in a manner of Working Example 1 to check whether or not short-circuit failure occurred therein. As a result, the short-circuit failure ratio of the multi-layered ceramic capacitor samples was found to be 34% and it was found that the short-circuit failure was so high that the samples were of no practical use.

Comparative Example 7

A conductive paste was prepared in the manner of Working Example 7 except that ethyl cellulose having a weight average molecular weight of 230,000 was used as a binder of the conductive paste and the viscosity of the thus prepared conductive paste was measured under conditions of a temperature of 25° C. and shearing velocity of 8 $sec^{-1}$ and was also measured under conditions of a temperature of 25° C. and shearing velocity of 50 $sec^{-1}$.

As a result, it was found that the viscosity of the conductive paste measured under condition of the shearing velocity of 8 $sec^{-1}$ was 21.3 Ps·s and that the viscosity of the conductive paste measured under condition of the shearing velocity of 50 $sec^{-1}$ was 11.75 Ps·s.

As a result, it was found that the viscosity of the conductive paste measured under condition of the shearing velocity of 8 $sec^{-1}$ was 21.3 Ps·s and that the viscosity of the conductive paste measured under condition of the shearing velocity of 50 $sec^{-1}$ was 11.75 Ps·s.

Then, the thus prepared conductive paste was printed on a ceramic green sheet fabricated in the manner of Working Example 1 using a screen printing machine, thereby forming an electrode layer having a thickness of 1 µm. Thus, a multi-layered unit including the ceramic green sheet and the electrode layer laminated on the polyethylene terephthalate film was fabricated.

The surface roughness (Ra) of the thus formed electrode layer was measured using the "SURFCORDER (SE-30D)" (Product Name) manufactured by Kosaka Laboratory Ltd. in the manner of Working Example 1. As a result, it was found that the surface roughness (Ra) of the electrode layer was 0.192 µm and that since the surface roughness of the electrode layer was too high, the electrode layer having a high surface smoothness could not be formed.

It was reasonable to conclude that this was because the viscosity of the conductive paste at the shearing velocity of 50 $sec^{-1}$ was too high to print the conductive paste in a desired manner.

Further, a total of fifty multi-layered ceramic capacitor samples were fabricated and the resistance value of each of the thus fabricated multi-layered ceramic capacitor samples was measured using a multi-meter in a manner of Working Example 1 to check whether or not short-circuit failure occurred therein. As a result, the short-circuit failure ratio of the multi-layered ceramic capacitor samples was found to be 40% and it was found that the short-circuit failure was very high.

Comparative Example 8

A conductive paste was prepared in the manner of Working Example 7 except that ethyl cellulose having a weight average molecular weight of 130,000 was used as a binder of a conductive paste and the viscosity of the thus prepared conductive paste was measured under conditions of a temperature of 25° C. and shearing velocity of 8 $sec^{-1}$ and was also measured under conditions of a temperature of 25° C. and shearing velocity of 50 $sec^{-1}$.

As a result, it was found that the viscosity of the conductive paste measured under condition of the shearing velocity of 8 $sec^{-1}$ was 5.3 Ps·s and that the viscosity of the conductive paste measured under condition of the shearing velocity of 50 $sec^{-1}$ was 3.0 Ps·s.

Then, the thus prepared conductive paste was printed on a ceramic green sheet fabricated in the manner of Working Example 1 using a screen printing machine, thereby forming an electrode layer having a thickness of 1 µm. Thus, a multi-layered unit including the ceramic green sheet and the electrode layer laminated on the polyethylene terephthalate film was fabricated.

The surface roughness (Ra) of the thus formed electrode layer was measured using the "SURFCORDER (SE-30D)" (Product Name) manufactured by Kosaka Laboratory Ltd. in the manner of Working Example 1. As a result, it was found that the surface roughness (Ra) of the electrode layer was 0.071 µm and that the surface smoothness of the electrode layer was high. However, it was found that since the viscosity of the conductive paste at the shearing velocity of 50 $sec^{-1}$ was too low and the fluidity of the conductive paste was too high, the conductive paste leaked from a screen printing plate and the electrode layer could not be printed in a desired manner.

Comparative Example 9

A dielectric paste for forming a ceramic green sheet was prepared in the manner of Working Example 1 except that butyral system resin whose degree of polymerization was 800 and degree of butyralization was 69 mol % was used as a binder of the dielectric paste for forming a ceramic green sheet, thereby forming a ceramic green sheet.

Further, a conductive paste was prepared in the manner of Working Example 8 and the viscosity of the thus prepared dielectric paste for forming a ceramic green sheet was measured under conditions of a temperature of 25° C. and shearing velocity of 8 $sec^{-1}$ and was also measured under conditions of a temperature of 25° C. and shearing velocity of 50 $sec^{-1}$.

As a result, it was found that the viscosity of the conductive paste measured under condition of the shearing velocity of 8 $sec^{-1}$ was 11.7 Ps·s and that the viscosity of the conductive paste measured under condition of the shearing velocity of 50 $sec^{-1}$ was 6.6 Ps·s.

Then, the thus prepared conductive paste was printed on a ceramic green sheet fabricated in the manner of Working Example 1 using a screen printing machine, thereby forming an electrode layer having a thickness of 1 µm. Thus, a multi-layered unit including the ceramic green sheet and the electrode layer laminated on the polyethylene terephthalate film was fabricated.

The surface roughness (Ra) of the thus formed electrode layer was measured using the "SURFCORDER (SE-30D)" (Product Name) manufactured by Kosaka Laboratory Ltd. in the manner of Working Example 1. As a result, it was found that the surface roughness (Ra) of the electrode layer was 0.091 µm and that the electrode layer having a high surface smoothness was formed.

Further, a total of fifty multi-layered ceramic capacitor samples were fabricated and the resistance value of each of the thus fabricated multi-layered ceramic capacitor samples was measured using a multi-meter in a manner of Working Example 1 to check whether or not short-circuit failure occurred therein. As a result, the short-circuit failure ratio of the multi-layered ceramic capacitor samples was found to be 30% and it was found that the short-circuit failure was so high that the samples were of no practical use.

Comparative Example 10

A conductive paste was prepared in the manner of Comparative Example 2 except that a mixed solvent of terpineol and kerosene (mixture ratio (mass ratio) of 50:50) was used instead of isobornyl acetate as the solvent for preparing the conductive paste and the viscosity of the thus prepared conductive paste was measured under conditions of a temperature of 25° C. and shearing velocity of 8 sec$^{-1}$ and was also measured under conditions of a temperature of 25° C. and shearing velocity of 50 sec$^{-1}$.

As a result, it was found that the viscosity of the conductive paste measured under condition of the shearing velocity of 8 sec$^{-1}$ was 10.7 Ps·s and that the viscosity of the conductive paste measured under condition of the shearing velocity of 50 sec$^{-1}$ was 6.7 Ps·s.

Then, the thus prepared conductive paste was printed on a ceramic green sheet fabricated in the manner of Working Example 1 using a screen printing machine, thereby forming an electrode layer having a thickness of 1 μm. Thus, a multi-layered unit including the ceramic green sheet and the electrode layer laminated on the polyethylene terephthalate film was fabricated.

The surface roughness (Ra) of the thus formed electrode layer was measured using the "SURFCORDER (SE-30D)" (Product Name) manufactured by Kosaka Laboratory Ltd. in the manner of Working Example 1. As a result, it was found that the surface roughness (Ra) of the electrode layer was 0.129 μm and that the electrode layer having a high surface smoothness was formed.

Further, a total of fifty multi-layered ceramic capacitor samples were fabricated and the resistance value of each of the thus fabricated multi-layered ceramic capacitor samples was measured using a multi-meter in a manner of Working Example 1 to check whether or not short-circuit failure occurred therein. As a result, the short-circuit failure ratio of the multi-layered ceramic capacitor samples was found to be 76% and it was found that the short-circuit failure was so high that the samples were of no practical use.

It is reasonable to conclude that this was because the mixed solvent of terpineol and kerosene used as a solvent of the conductive paste dissolved a copolymer of methyl methacrylate and butyl acrylate used as the binder of the ceramic green sheet.

Comparative Example 11

A conductive paste was prepared in the manner of Comparative Example 2 except that terpineol was used instead of isobornyl acetate as the solvent for preparing the conductive paste and the viscosity of the thus prepared conductive paste was measured under conditions of a temperature of 25° C. and shearing velocity of 8 sec$^{-1}$ and was also velocity of 50 sec$^{-1}$.

As a result, it was found that the viscosity of the conductive paste measured under condition of the shearing velocity of 8 sec$^{-1}$ was 13.1 Ps·s and that the viscosity of the conductive paste measured under condition of the shearing velocity of 50 sec$^{-1}$ was 6.9 Ps·s.

Then, the thus prepared conductive paste was printed on a ceramic green sheet fabricated in the manner of Working Example 1 using a screen printing machine, thereby forming an electrode layer having a thickness of 1 μm. Thus, a multi-layered unit including the ceramic green sheet and the electrode layer laminated on the polyethylene terephthalate film was fabricated.

The surface roughness (Ra) of the thus formed electrode layer was measured using the "SURFCORDER (SE-30D)" (Product Name) manufactured by Kosaka Laboratory Ltd. in the manner of Working Example 1. As a result, it was found that the surface roughness (Ra) of the electrode layer was 0.192 μm and that since the surface roughness of the electrode layer was too high, the electrode layer having a high surface smoothness could not be formed.

It is reasonable to conclude that this was because terpineol used as a solvent of the conductive paste dissolved a copolymer of methyl methacrylate and butyl acrylate used as the binder of the ceramic green sheet.

Further, a total of fifty multi-layered ceramic capacitor samples were fabricated and the resistance value of each of the thus fabricated multi-layered ceramic capacitor samples was measured using a multi-meter in a manner of Working Example 1 to check whether or not short-circuit failure occurred therein. As a result, the short-circuit failure ratio of the multi-layered ceramic capacitor samples was found to be 88% and it was found that the short-circuit failure was so high that the samples were of no practical use.

It is reasonable to conclude that this was because terpineol used as a solvent of the conductive paste dissolved a copolymer of methyl methacrylate and butyl acrylate used as the binder of the ceramic green sheet.

Comparative Example 12

A conductive paste was prepared in the manner of Comparative Example 2 except that dihydroterpineol was used instead of isobornyl acetate as the solvent for preparing the conductive paste and the viscosity of the thus prepared conductive paste was measured under conditions of a temperature of 25° C. and shearing velocity of 8 sec$^{311}$ and was also measured under conditions of a temperature of 25° C. and shearing velocity of 50 sec$^{-1}$.

As a result, it was found that the viscosity of the conductive paste measured under condition of the shearing velocity of 8 sec$^{-1}$ was 13.4 Ps·s and that the viscosity of the conductive paste measured under condition of the shearing velocity of 50 sec$^{-1}$ was 6.8 Ps·s.

Then, the thus prepared conductive paste was printed on a ceramic green sheet fabricated in the manner of Working Example 1 using a screen printing machine, thereby forming an electrode layer having a thickness of 1 μm. Thus, a multi-layered unit including the ceramic green sheet and the electrode layer laminated on the polyethylene terephthalate film was fabricated.

The surface roughness (Ra) of the thus formed electrode layer was measured using the "SURFCORDER (SE-30D)" (Product Name) manufactured by Kosaka Laboratory Ltd. in the manner of Working Example 1. As a result, it was found that the surface roughness (Ra) of the electrode layer was 0.129 μm and that the electrode layer having a high surface smoothness was formed.

Further, a total of fifty multi-layered ceramic capacitor samples were fabricated and the resistance value of each of the thus fabricated multi-layered ceramic capacitor samples was measured using a multi-meter in the manner of Working Example 1 to check whether or not short-circuit failure occurred therein. As a result, the short-circuit failure ratio of the multi-layered ceramic capacitor samples was found to be 56% and it was found that the short-circuit failure was so high that the samples were of no practical use.

It is reasonable to conclude that this was because dihydroterpineol used as a solvent of the conductive paste dissolved a copolymer of methyl methacrylate and butyl acrylate used as the binder of the ceramic green sheet.

It was found from Working Examples 1 to 15 and Comparative Examples 10 to 12 that in the case where the conductive paste containing ethyl cellulose having a weight average molecular weight of 130,000 as a binder and the mixed solvent of terpineol and kerosene (mixture ratio (mass ratio) of 50:50) as a solvent, the conductive paste containing ethyl cellulose having a weight average molecular weight of 130,000 as a binder and terpineol as a solvent or the conductive paste containing ethyl cellulose having a weight average molecular weight of 130,000 as a binder and dihydroterpineol as a solvent was printed on the ceramic green sheet formed by using the dielectric paste containing polyvinyl butyral whose degree of polymerization was 1450 and degree of butyralization was 69 mol % as a binder, thereby fabricating the multi-layered unit, and the fifty multi-layered units were laminated, thereby fabricating the multi-layered ceramic capacitor, the solvent of the conductive paste dissolved polyvinyl butyral contained in the ceramic green sheet as a binder, so that the ceramic green sheet was swollen or partially dissolved, thereby generating pinholes or cracks in the ceramic green sheet and causing the short-circuit failure ratio of the multi-layered ceramic capacitors to become extremely high, while in the case where the conductive paste containing ethyl cellulose having an apparent weight average molecular weight of 155,000 to 205,000 defined by $X*MW_L+(1-X)*MW_H$ as a binder and isobornyl acetate, dihydroterpinyl methyl ether, terpinyl methyl ether, α-terpinyl acetate, I-dihydrocarvyl acetate, I-menthone, I-menthyl acetate, I-perillyl acetate or I-carvyl acetate as a solvent was printed on the ceramic green sheet formed by using the dielectric paste containing polyvinyl butyral whose degree of polymerization was 1450 and degree of butyralization was 69 mol % as a binder, thereby fabricating the multi-layered unit, and the fifty multi-layered units were laminated, thereby fabricating the multi-layered ceramic capacitor, the solvent of the conductive paste hardly dissolved polyvinyl butyral contained in the ceramic green sheet as a binder, so that the ceramic green sheet was not swollen or partially dissolved, thereby preventing generation of pinholes or cracks in the ceramic green sheet and markedly decreasing the short-circuit failure ratio of the multi-layered ceramic capacitors.

Further, it was found from Working Examples 1 to 15 and Comparative Examples 1, 4 and 7 that in the case where the conductive paste containing ethyl cellulose having a weight average molecular weight of 230,000 as a binder and isobornyl acetate as a solvent, the conductive paste containing ethyl cellulose having a weight average molecular weight of 230,000 as a binder and dihydroterpinyl methyl ether as a solvent or the conductive paste containing ethyl cellulose having a weight average molecular weight of 230,000 as a binder and terpinyl methyl ether as a solvent was printed on the ceramic green sheet formed by using the dielectric paste containing polyvinyl butyral whose degree of polymerization was 1450 and degree of butyralization was 69 mol % as a binder, thereby fabricating the multi-layered unit, and the fifty multi-layered units were laminated, thereby fabricating the multi-layered ceramic capacitor, the viscosity of the conductive paste was so high that it was impossible to print the conductive paste on the ceramic green sheet in a desired manner to form the electric layer having a high surface smoothness, so that the short-circuit failure ratio of the multi-layered ceramic capacitors became extremely high, while in the case where the conductive paste containing ethyl cellulose having an apparent weight average molecular weight of 155,000 to 205,000 defined by $X*MW_L+(1-X)*MW_H$ as a binder and isobornyl acetate, dihydroterpinyl methyl ether, terpinyl methyl ether, α-terpinyl acetate, I-dihydrocarvyl acetate, I-menthone, I-menthyl acetate, I-perillyl acetate or I-carvyl acetate as a solvent was printed on the ceramic green sheet formed by using the dielectric paste containing polyvinyl butyral whose degree of polymerization was 1450 and degree of butyralization was 69 mol % as a binder, thereby fabricating the multi-layered unit, and the fifty multi-layered units were laminated, thereby fabricating the multi-layered ceramic capacitor, the conductive paste had a viscosity suitable for printing, so that it was possible to form an electric layer on a ceramic green sheet in a predetermined pattern using a screen printing machine in a desired manner and fabricate the multi-layered ceramic capacitors whose short-circuit failure ratio was low.

Furthermore, it was found from Working Examples 1 to 15 and Comparative Examples 2, 5 and 8 that in the case where the conductive paste containing ethyl cellulose having a weight average molecular weight of 130,000 as a binder and isobornyl acetate as a solvent, the conductive paste containing ethyl cellulose having a weight average molecular weight of 130,000 as a binder and dihydroterpinyl methyl ether as a solvent or the conductive paste containing ethyl cellulose having a weight average molecular weight of 130,000 as a binder and terpinyl methyl ether as a solvent was printed on the ceramic green sheet formed by using the dielectric paste containing polyvinyl butyral whose degree of polymerization was 1450 and degree of butyralization was 69 mol % as a binder, thereby fabricating the multi-layered unit, the viscosity of the conductive paste was too low and the fluidity of the conductive paste was too high, so that the conductive paste leaked from a screen printing plate and the electrode layer could not be formed in a desired pattern, while in the case where the conductive paste containing ethyl cellulose having an apparent weight average molecular weight of 155,000 to 205,000 defined by $X*MW_L+(1-X)*MW_H$ as a binder and isobornyl acetate, dihydroterpinyl methyl ether, terpinyl methyl ether, α-terpinyl acetate, I-dihydrocarvyl acetate, I-menthone, I-menthyl acetate, I-perillyl acetate or I-carvyl acetate as a solvent was printed on the ceramic green sheet formed by using the dielectric paste containing polyvinyl butyral whose degree of polymerization was 1450 and degree of butyralization was 69 mol % as a binder, thereby fabricating the multi-layered unit, and the fifty multi-layered units were laminated, thereby fabricating the multi-layered ceramic capacitor, the conductive paste had a viscosity suitable for printing, so that it was possible to form an electric layer on a ceramic green sheet in a predetermined pattern using a screen printing machine in a desired manner and fabricate the multi-layered ceramic capacitors whose short-circuit failure ratio was low.

Moreover, it was found from Working Examples 1 to 15 and Comparative Examples 3, 6 and 9 that in the case where the conductive paste containing ethyl cellulose having an apparent weight average molecular weight of 180,000 as a binder and isobornyl acetate as a solvent, the conductive paste containing ethyl cellulose having an apparent weight average molecular weight of 180,000 as a binder and dihydroterpinyl methyl ether as a solvent or the conductive paste containing ethyl cellulose having an apparent weight average molecular weight of 180,000 as a binder and terpinyl methyl ether as a solvent was printed on the ceramic green sheet formed by using the dielectric paste containing polyvinyl butyral whose degree of polymerization was 1450 and degree of butyralization was 69 mol % as a binder, thereby fabricating the multi-layered unit, the short-circuit failure ratio of the multi-layered ceramic capacitors became very high, while in the case where the conductive paste containing ethyl cellulose having an apparent weight average molecular weight of 155,000 to 205,000 defined by $X* MW_L+(1-X)*MW_H$ as a binder and isobornyl acetate, dihydroterpinyl methyl ether, terpinyl methyl ether, α-terpinyl acetate, I-dihydrocarvyl acetate, I-menthone, I-menthyl acetate, I-perillyl acetate or I-carvyl acetate as a solvent was printed on the ceramic green sheet formed by using the dielectric paste containing polyvinyl butyral whose degree of polymerization was 1450 and degree of butyralization was 69 mol % as a binder, thereby fabricating the multi-layered unit, and the fifty multi-layered units were laminated, thereby fabricating the multi-layered ceramic capacitor, the solvent of the conductive paste hardly dissolved polyvinyl butyral contained in the ceramic green sheet as a binder, so that it was possible to prevent the ceramic green sheet being swollen or partially dissolved, thereby preventing generation of pinholes or cracks in the ceramic green sheet and markedly decreasing the short-circuit failure ratio of the multi-layered ceramic capacitors.

Further, it was found that in the case where a dielectric paste adapted for forming a spacer layer and containing ethyl cellulose having an apparent weight average molecular weight of 110,000 to 180,000 defined by $X*MW_L+(1-X)*MW_H$ as a binder and isobornyl acetate, dihydroterpinyl methyl ether, terpinyl methyl ether, α-terpinyl acetate, I-dihydrocarvyl acetate, I-menthone, I-menthyl acetate, I-perillyl acetate or I-carvyl acetate as a solvent was prepared and the dielectric paste was printed on the ceramic green sheet in a complimentary pattern to that of the electrode layer, thereby forming a spacer layer, the same results as those above were obtained.

The present invention has thus been shown and described with reference to the preferred embodiments and the working examples. However, it should be noted that the present invention is in no way limited to the details of the described arrangement but changes and modifications may be made without departing from the scope of the appended claims.

According to the present invention, it is possible to provide a conductive paste for a multi-layered ceramic electronic component which does not dissolve a binder contained in a layer adjacent to an electrode layer of the multi-layered ceramic electronic component, can reliably prevent short circuit failure from occurring in a multi-layered ceramic electronic component and has excellent printability.

Further, according to the present invention, it is possible to provide a method for manufacturing a multi-layered unit for a multi-layered ceramic electronic component which can reliably prevent short circuit failure from occurring in a multi-layered ceramic electronic component and form an electrode layer in a desired manner.

The invention claimed is:

1. A conductive paste comprising:
a conductive material; and
a binder containing ethyl cellulose having a weight average molecular weight of $MW_L$ and ethyl cellulose having a weight average molecular weight of $MW_H$ at a weight ratio of $X:(1-X)$, where $MW_L$, $MW_H$ and X are selected so that $X*MW_L+(1-X)*MW_H$ falls within a range of 145,000 to 215,000 and at least one solvent selected from the group consisting of isobornyl acetate, dihydroterpinyl methyl ether, terpinyl methyl ether, α-terpinyl acetate, I-dihydrocarvyl acetate, I-menthone, I-menthyl acetate, I-perillyl acetate and I-carvyl acetate.

2. A conductive paste in accordance with claim 1, wherein $MW_L$, $MW_H$ and X are selected so that $X*MW_L+(1-X)*MW_H$ falls within a range of 155,000 to 205,000.

3. A method for manufacturing a multi-layered unit for a multi-layered ceramic electronic component comprising a step of printing a conductive paste including a conductive material and a binder containing ethyl cellulose having a weight average molecular weight of $MW_L$ and ethyl cellulose having a weight average molecular weight of $MW_H$ at a weight ratio of $X:(1-X)$, where $MW_L$, $MW_H$ and X are selected so that $X*MW_L+(1-X)*MW_H$ falls within a range of 145,000 to 215,000 and at least one solvent selected from the group consisting of isobornyl acetate, dihydroterpinyl methyl ether, terpinyl methyl ether, α-terpinyl acetate, I-dihydrocarvyl acetate, I-menthone, I-menthyl acetate, perillyl acetate and I-carvyl acetate on a ceramic green sheet containing a butyral system resin as a binder in a predetermined pattern, thereby forming an electrode layer.

4. A method for manufacturing a multi-layered unit for a multi-layered ceramic electronic component in accordance with claim 3, wherein $MW_L$, $MW_H$ and X are selected so that $X*MW_L+(1-X)*MW_H$ falls within a range of 155,000 to 205,000.

5. A method for manufacturing a multi-layered unit for a multi-layered ceramic electronic component in accordance with claim 3, which further comprises a step of printing a dielectric paste containing a binder containing ethyl cellulose having a weight average molecular weight of $MW_L$ and ethyl cellulose having a weight average molecular weight of $MW_H$ at a weight ratio of $X:(1-X)$, where $MW_L$, $MW_H$ and X are selected so that $X*MW_L+(1-X)*MW_H$ falls within a range of 110,000 to 180,000 and at least one solvent selected from the group consisting of isobornyl acetate, dihydroterpinyl methyl ether, terpinyl methyl ether, α-terpinyl acetate, I-dihydrocarvyl acetate, I-menthone, I-menthyl acetate, I-perillyl acetate and I-carvyl acetate on a ceramic green sheet in a predetermined pattern, thereby forming an electrode layer on the ceramic green sheet in a complementary pattern to that of the electrode layer after drying the electrode layer, thereby forming a spacer layer.

6. A method for manufacturing a multi-layered unit for a multi-layered ceramic electronic component in accordance with claim 3, which further comprises a step of printing a dielectric paste containing a binder containing ethyl cellulose having a weight average molecular weight of $MW_L$ and ethyl cellulose having a weight average molecular weight of $MW_H$ at a weight ratio of $X:(1-X)$, where $MW_L$, $MW_H$ and X are selected so that $X*MW_L+(1-X)*MW_H$ falls within a range of 110,000 to 180,000 and at least one solvent selected from the group consisting of isobornyl acetate, dihydroterpinyl methyl ether, terpinyl methyl ether, α-terpinyl acetate, I-dihydrocarvyl acetate, I-menthone, I-menthyl acetate, I-perillyl acetate and I-carvyl acetate on the ceramic green sheet in a complementary pattern to that of the electrode layer prior to forming the electrode layer, thereby forming a spacer layer.

7. A method for manufacturing a multi-layered unit for a multi-layered ceramic electronic component in accordance with claim 3, wherein the degree of polymerization of a butyral system resin contained in a ceramic green sheet as a binder is equal to or larger than 1000.

8. A method for manufacturing a multi-layered unit for a multi-layered ceramic electronic component in accordance with claim 3, wherein the degree of butyralization of butyral system resin contained in a ceramic green sheet as a binder is equal to or larger than 64 mol % and equal to or smaller than 78 mol %.

* * * * *